(12) United States Patent
Chang et al.

(10) Patent No.: US 8,531,474 B2
(45) Date of Patent: Sep. 10, 2013

(54) METHODS, SYSTEMS AND APPARATUS FOR JOINTLY CALIBRATING MULTIPLE DISPLAYS IN A DISPLAY ENSEMBLE

(75) Inventors: James Zhixin Chang, Vancouver, WA (US); John C. Dalrymple, Portland, OR (US); Chizu Watanabe, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 14 days.

(21) Appl. No.: 13/294,888

(22) Filed: Nov. 11, 2011

(65) Prior Publication Data
US 2013/0120589 A1 May 16, 2013

(51) Int. Cl.
*G09G 5/00* (2006.01)
*G09G 5/02* (2006.01)
*G09G 3/30* (2006.01)
*H04N 17/02* (2006.01)
*H04N 5/225* (2006.01)
*H04N 11/00* (2006.01)
*H04N 1/46* (2006.01)
*G03F 3/08* (2006.01)
*G06K 9/00* (2006.01)
*G06K 9/40* (2006.01)
*G06K 9/20* (2006.01)
*H04N 9/12* (2006.01)
*H04N 1/40* (2006.01)

(52) U.S. Cl.
USPC ........... 345/589; 345/601; 345/690; 345/590; 345/1.1; 345/77; 348/175; 348/180; 348/207.1; 348/552; 348/739; 358/504; 358/518; 358/523; 358/525; 358/448; 382/165; 382/167; 382/254; 382/274; 382/312

(58) Field of Classification Search
USPC ................ 345/581, 589, 590–591, 600–601, 345/603–604, 597, 606, 619, 549, 204, 690–691, 345/20, 22, 63, 77, 903, 211, 1.1, 5–6, 36, 345/45, 610, 618, 643–644; 348/41, 104, 348/159, 169, 187–188, 207.1, 207.99, 253–254, 348/552, 557, 560, 576–577, 630, 708, 739, 348/602, 47–48, 207.11; 358/504, 515, 518–519, 523–525, 448, 509; 382/162, 165, 167, 254, 274, 276, 312, 300
See application file for complete search history.

(56) References Cited

U.S. PATENT DOCUMENTS 5,216,504 A 6/1993 Webb et al.
5,475,447 A 12/1995 Funado
(Continued)

FOREIGN PATENT DOCUMENTS

EP 1134973 A2 9/2001
EP 1699035 A1 9/2006
(Continued)

OTHER PUBLICATIONS

F. Martinez-Verdu, J. Pujol, and P. Capilla, "Characterization of a Digital Camera as an Absolute Tristimulus Colorimeter," Journal of Imaging Science and Technology, Jul./Aug. 2003, pp. 279-295 and pp. 372-374, vol. 47, No. 4.

(Continued)

*Primary Examiner* — Wesner Sajous
(74) *Attorney, Agent, or Firm* — Kristine Elizabeth Matthews; David C. Ripma

(57) ABSTRACT

Aspects of the present invention are related to systems, methods and apparatus for calibration of multiple display apparatus in a display ensemble.

39 Claims, 16 Drawing Sheets

(56) References Cited

U.S. PATENT DOCUMENTS

| | | |
|---|---|---|
| 6,483,555 B1 | 11/2002 | Thielemans et al. |
| 6,750,992 B1 * | 6/2004 | Holub .......................... 358/504 |
| 6,771,307 B2 | 8/2004 | Waki et al. |
| 7,639,260 B2 | 12/2009 | Bala et al. |
| 7,639,401 B2 | 12/2009 | Bala et al. |
| 2001/0019358 A1 | 9/2001 | Waki et al. |
| 2005/0174591 A1 * | 8/2005 | Sowinski et al. .............. 358/1.9 |
| 2006/0238832 A1 | 10/2006 | Ohsawa |
| 2007/0154086 A1 | 7/2007 | Cho et al. |
| 2009/0021587 A1 | 1/2009 | Snyderman et al. |
| 2009/0201309 A1 * | 8/2009 | Demos .......................... 345/589 |
| 2012/0056910 A1 * | 3/2012 | Safaee-Rad et al. .......... 345/690 |
| 2012/0056911 A1 * | 3/2012 | Safaee-Rad et al. .......... 345/690 |

FOREIGN PATENT DOCUMENTS

| | | |
|---|---|---|
| EP | 1804518 A2 | 7/2007 |
| JP | 2002-267574 A | 9/2002 |
| WO | 93/06694 A1 | 4/1993 |
| WO | 97/48232 A1 | 12/1997 |

OTHER PUBLICATIONS

F. Martinez-Verdu, J. Pujol, M. Vilaseca, and P. Capilla, "Characterization of a digital camera as an absolute tristimulus colorimeter," Color Imaging VIII: Processing, Hardcopy, and Applications, 2003, pp. 197-208, vol. 5008, Proceedings of the SPIE.

\* cited by examiner

METHODS, SYSTEMS AND APPARATUS FOR JOINTLY CALIBRATING MULTIPLE DISPLAYS IN A DISPLAY ENSEMBLE

FIELD OF THE INVENTION

Embodiments of the present invention relate generally to methods, systems and apparatus for color-display calibration and, in particular, to methods, systems and apparatus for jointly calibrating multiple displays in a display ensemble.

BACKGROUND

In a display ensemble comprising multiple color display apparatus, wherein a color display apparatus, also referred to as a color display or a display, comprises a color display device and a set of R, G and B Gamma one-dimensional look-up tables (1D LUTs), it may be desirable to calibrate all of the color displays to the same gray-scale chromaticity values, tone response function, also referred to as gamma curve, and maximum luminance value in order to assure consistent image appearance across display boundaries. Without calibration, when the same Red-Green-Blue (RGB) signals are sent to different color displays, even of the same make and model, each color display will, generally, produce different output colors, thereby making display boundaries noticeable and visually displeasing.

An RGB input signal received by a color display apparatus may be modified according to the RGB Gamma 1D LUTs, and the modified signals may be used to drive the color display device. The Gamma 1D LUTs may be used to set the proportions of maximum R, G and B signals, actually sent to the color display device, to achieve the desired displayed luminance and chromaticity at the white point. In addition, the Gamma 1D LUTs may be used to set the R, G and B signal levels, actually sent to the color display device, along the gray scale to control the chromaticity and tone response produced for gray, also considered equi-RGB, signals received by the color display apparatus.

A model of a response function, of a color display device, that predicts the color output, in CIE XYZ, from an input RGB signal may be required to properly generate the data for the RGB Gamma 1D LUTs. A model of the display device response function may be obtained by measuring the colors actually displayed, on the display device, in response to a variety of different RGB signal inputs, presented to the display device, and inverting the measured relationship between the displayed colors and the RGB signal inputs. The model of an individual display device may be used to generate the data for that display's RGB Gamma 1D LUTs, which may be used to modify that display's input RGB signals to achieve the desired chromaticity along the gray scale, the desired tone response function and the desired maximum luminance. By loading appropriate data into each display's Gamma 1D LUTs, the gray scale chromaticity, tone response function and maximum luminance may be made the same for all the displays, provided the desired chromaticity and maximum luminance are achievable on each display.

A color-measurement device, for example, a colorimeter or a spectroradiometer, may be used to measure a display's color outputs. A more accurate calibration may require more measurements with different RGB input signals, especially around the gray scale, making more accurate calibrations more time consuming and hence, more costly. Methods, systems and apparatus for generating an accurate calibration, with a small number of color measurements made of the display using a color-measurement device, may be desirable.

SUMMARY

Some embodiments of the present invention comprise methods, systems and apparatus for calibration of multiple displays in a display ensemble.

According to a first aspect of the present invention, a camera-calibration model associated with a display, in a display ensemble, may be generated based on one or more color images, acquired using a digital color camera, of the display and a plurality of color measurements made of the display using a color-measurement device.

According to a second aspect of the present invention, a display-calibration model may be generated for a display, in a display ensemble, using a digital color camera and a previously determined camera-calibration model associated with the display.

According to a third aspect of the present invention, a display-calibration model may be generated in a two-pass process, wherein the first pass comprises an initial estimation of a display response function and the second pass comprises refinement of the initial estimate.

According to a fourth aspect of the present invention, an initial estimate of a display response function may be generated using a color-measurement device.

According to a fifth aspect of the present invention, an initial estimate of a display response function may be generated using a digital color camera and a previously determined camera-calibration model.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 16:
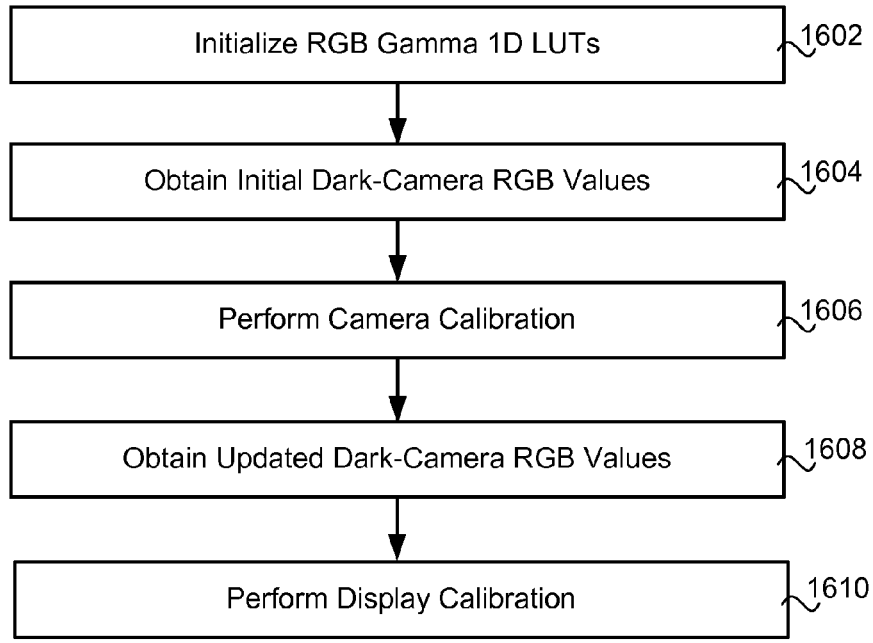
Figure 17:
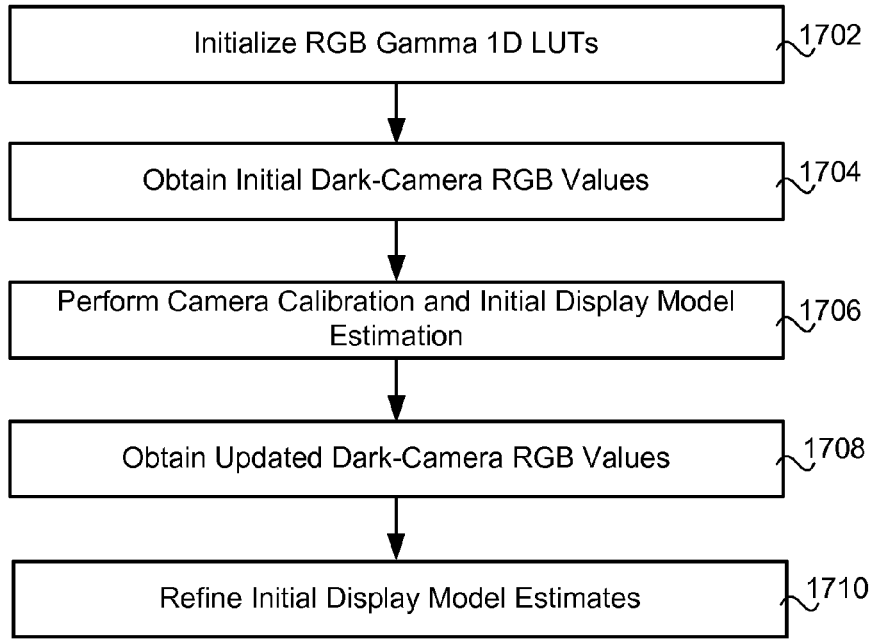

FIG. 16 is a chart depicting exemplary embodiments of the present invention, wherein dark-camera values may be obtained prior to camera calibration and prior to display calibration; and FIG. 17 is a chart depicting exemplary embodiments of the present invention wherein dark-camera values may be obtained prior to camera calibration and initial display model estimation and prior to display model refinement.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Similarly, for example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, a floppy disk, an optical disk, a magneto-optical disk, a Digital Versatile Disc (DVD), a Compact Disc (CD), a micro-drive and other disk storage media, a Read-Only Memory (ROM), a Programmable Read-Only Memory (PROM), an Erasable Programmable Read-Only Memory (EPROM), an Electrically Erasable Programmable Read-Only Memory (EEPROM), a Random-Access Memory (RAM), a Video Random-Access Memory (VRAM), a Dynamic Random-Access Memory (DRAM) and any type of media or device suitable for storing instructions and/or data.

Although embodiments of the present invention may be described in relation to a specific color space, it is understood that another color space may be used.

In a display ensemble comprising multiple color displays, it may be desirable to calibrate all of the color displays to the same gray-scale chromaticity values, tone response function, also referred to as gamma curve, and maximum luminance value in order to assure consistent image appearance across display boundaries. Target, also considered desired, gray-scale chromaticity values and a target, also considered desired, tone response function may be specified by a user. Exemplary tone response functions may include a power-law gamma curve specified by the exponent, for example, 2.2, an sRGB tone response curve as specified in the IEC 61966-2-1:1999 standard, and other gamma curves known in the art. A specific target, also considered desired, maximum luminance value may be specified by a user, or a user may specify that the desired maximum luminance value may be the maximum luminance value that is jointly achievable by all displays in the display ensemble.

Without calibration, when the same Red-Green-Blue (RGB) signals are sent to different color displays, even of the same make and model, each color display will, generally, produce different output colors, thereby making display boundaries noticeable and visually displeasing.

Figure 1:
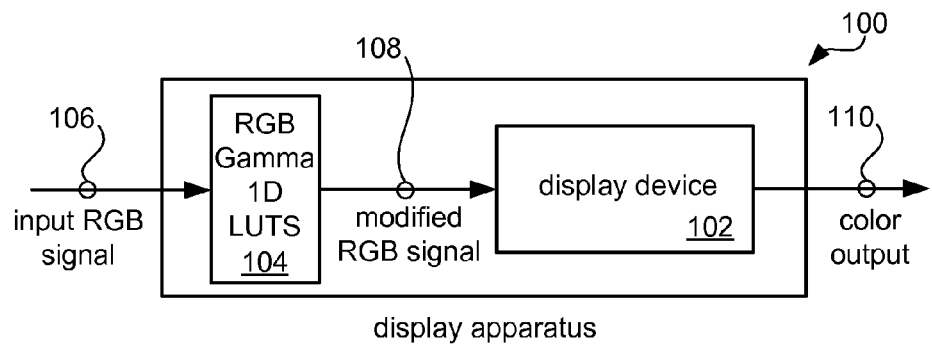
FIG. 1 is a picture illustrating an exemplary display apparatus.

FIG. 1 illustrates an exemplary color display apparatus 100 comprising a color display device 102 and a set of R, G and B Gamma one-dimensional look-up tables (1D LUTs) 104. An RGB input signal 106 received by the color display apparatus 100 may be modified according to the RGB Gamma 1D LUTs 104, and the modified signals 108 may be used to drive the color display device 102. The Gamma 1D LUTs 104 may be used to set the proportions of maximum R, G and B signals, actually sent 108 to the color display device 102, to achieve the desired displayed luminance and chromaticity at the white point. In addition, the Gamma 1D LUTs 104 may be used to set the R, G and B signal levels, actually sent 108 to the color display device 102, along the gray scale to control the chromaticity and tone response produced for gray, also considered equi-RGB, signals received 106 by the color display apparatus 100.

A model of a response function, of a color display device 102, that predicts the color output 110, in CIE XYZ, from a a device input RGB signal 108 may be required to properly generate the data for the RGB Gamma 1D LUTs 104. A model of the display device 102 response function may be obtained by measuring the colors actually displayed 110, on the display device 102, in response to a variety of different RGB signal inputs 108, presented to the display device 102, and inverting the measured relationship between the displayed colors 110 and the RGB signal inputs 108, presented to the display device 102. The model of an individual display device 102 may be used to generate the data for that display's RGB Gamma 1D LUTs 104, which may be used to modify that display's input RGB signals 106 to achieve the desired chromaticity along the gray scale, the desired tone response function and the desired maximum luminance. By loading appropriate data into each display's Gamma 1D LUTs 104, the gray scale chromaticity, tone response function and maximum luminance may be made the same for all the displays, provided the desired chromaticity and maximum luminance are achievable on each display.

A color-measurement device, for example, a colorimeter or a spectroradiometer, may be used to measure a display's color outputs. A more accurate calibration may require more measurements with different RGB input signals, especially around the gray scale, making more accurate calibrations more time consuming and hence, more costly. Methods, systems and apparatus for generating an accurate calibration, with a small number of color measurements made of the display using a color-measurement device, may be desirable.

In some embodiments of the present invention, a plurality of displays, in a display ensemble, may be calibrated using a digital color camera and an instrument for measuring display color outputs, also referred to as a color-measurement device. Exemplary color-measurement devices include a colorimeter, a spectroradiometer and other instruments capable of measuring a color output on a display.

Figure 2:
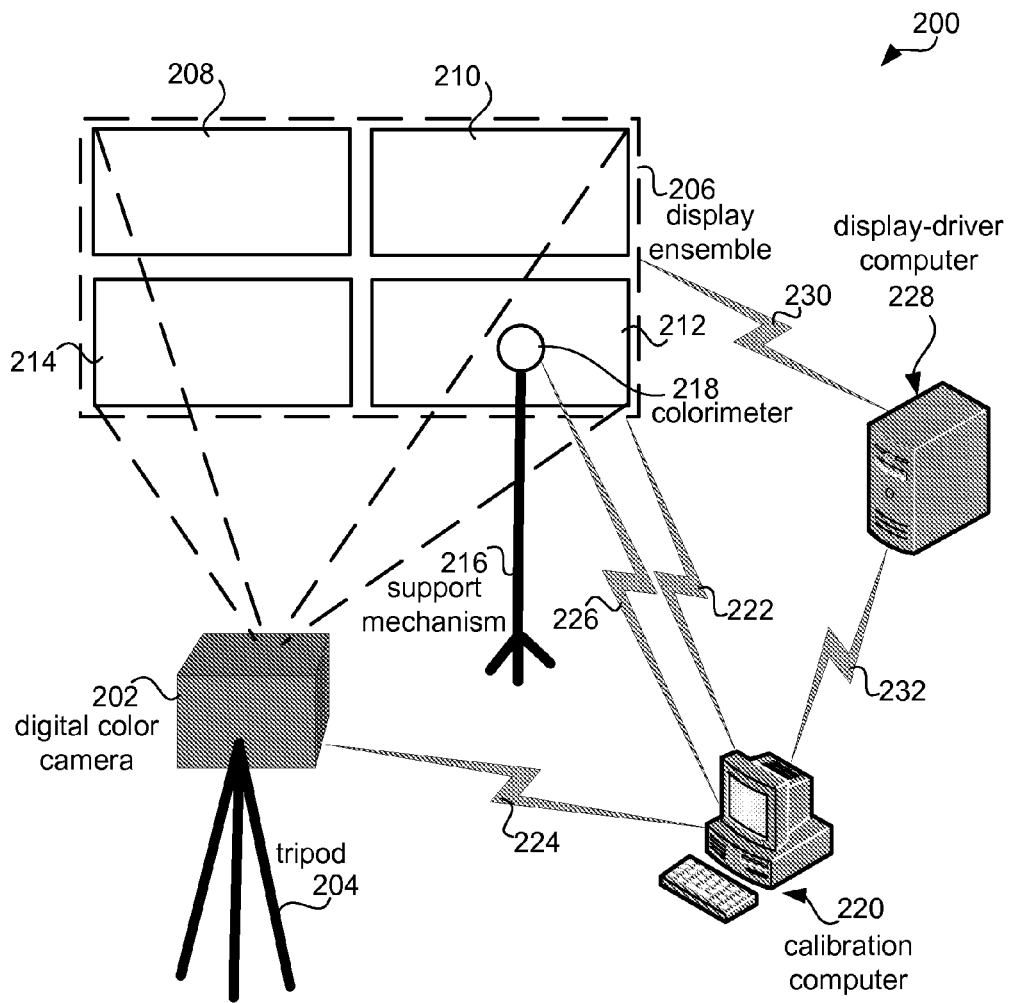
FIG. 2 is a picture illustrating exemplary embodiments of the present invention comprising an exemplary display ensemble, a digital color camera located on a tripod, a color-measurement device located on a support mechanism, a display-driver computer and a calibration computer.

FIG. 2 depicts an exemplary system architecture 200 according to some embodiments of the present invention. A digital color camera 202 may be mounted on a tripod 204 located at a location whereat the digital color camera 202 may acquire a full view of a display ensemble 206. In some embodiments of the present invention, a full view may be acquired as a single image, wherein the display ensemble 206 may be entirely contained in the digital color camera 202 field-of-view. In alternative embodiments of the present invention, a full view may be acquired through a panning, or other camera-movement, operation wherein multiple, partial views of the display ensemble 206 may be acquired, and wherein the partial views may be combined into a single, full-view image according to methods understood in the art. The display ensemble 206 may comprise multiple (four shown, 208, 210, 212, 214) color displays, each of which comprises a color display apparatus, comprising a color display device together with a set of downloadable Gamma 1D LUTs, wherein the Gamma 1D LUTs process RGB signals, also considered input RGB signals, received by the color display apparatus, and the processed RGB signals, also considered modified RGB signals, drive the color display device. A support mechanism 216 may be used for placing a colorimeter 218, or other instrument for measuring display color outputs, so that the colorimeter 218, or other instrument for measuring display color outputs, individually senses each color display 208, 210, 212, 214 to measure the respective display's output colors. Exemplary colorimeters include X-Rite's EyeOne Display 2 and Datacolor's Spyder 3.

The color displays 208, 210, 212, 214 in the display ensemble 206, the digital color camera 202 and the colorimeter 218 may be connected to a calibration computer 220 via wired, wireless or other communication links 222, 224, 226. A display-driver computer 228 may be used to drive, via a wired, wireless or other communication link 230 for graphics and video data transmission, the display ensemble 206. In some embodiments of the present invention, the display-driver computer 228 may be a single computer. In alternative embodiments (not shown), the display-driver computer may comprise a computing system, wherein a plurality of driver computers may be supervised by a coordinating computer to drive all of the color displays. In some of these alternative embodiments, the computing system may comprise one, or more, set-top boxes. In some embodiments of the present invention (shown), the display-driver computer 228 and the calibration computer 220 may be distinct computer systems. In these embodiments wherein the display-driver computer 228 and the calibration computer 220 are distinct computer systems, the display-driver computer 228 and the calibration computer 220 may be linked via a wired, wireless or other communication link 232. Exemplary communication links include a serial communication link via a serial port, a USB link, an Ethernet link and other wired and wireless communication links. In alternative embodiments of the present invention (not shown), one computer system may drive the display ensemble 206 and also function as the calibration computer.

A display-ensemble calibration program may reside on a non-transitory computer program product comprising a computer-readable storage medium having instructions stored thereon/in which may be used to program a calibration computer 220. The display-ensemble calibration program may instruct the calibration computer 220 to generate and send a command to the digital color camera 202 effectuating the acquisition, by the digital color camera 202, of an image of the display ensemble 206. The display-ensemble calibration program may instruct the calibration computer 220 to generate and send a command to command the display-driver computer 228 to drive the display ensemble 206 to display a color patch of a particular color, from a plurality of color-patch colors, on a particular color display 208, 210, 212, 214. The display-ensemble calibration program may instruct the calibration computer 220 to generate and send a command to the colorimeter 218 effectuating the acquisition of a color measurement on a particular color display 208, 210, 212, 214. The display-ensemble calibration program may prompt a user to reposition the colorimeter 218 for subsequent color measurements. The display-ensemble calibration program may collect and process image and measurement data to generate a camera calibration model for each of the color displays 208, 210, 212, 214 in the display ensemble 206; to collect and process image data from the digital color camera 202 to generate data comprising the contents of a Red, a Green or a Blue Gamma 1D look-up table (LUT), collectively referred to as RGB Gamma 1D LUTs and gamma tables, for each color display 208, 210, 212, 214 in the display ensemble 206; and to download the RGB Gamma 1D LUTs associated with a particular color display to the color display 208, 210, 212, 214 in the display ensemble 206.

Figure 3:
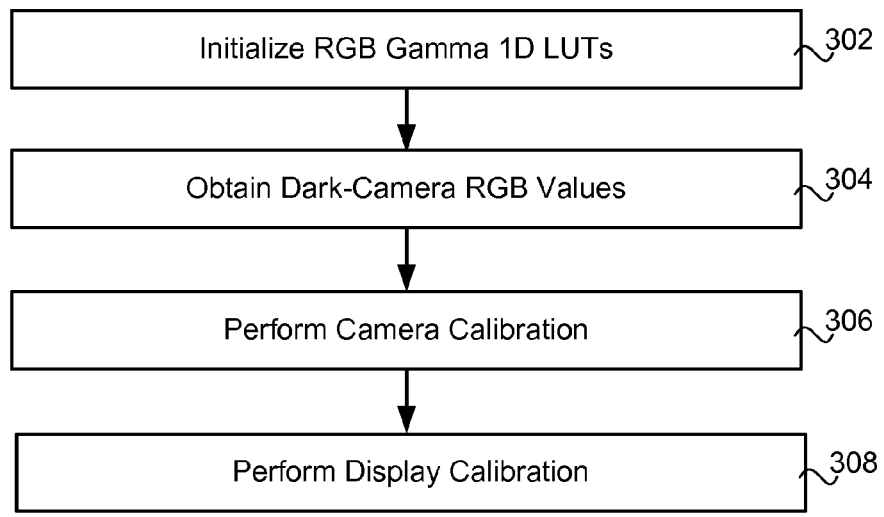
FIG. 3 is a chart depicting exemplary embodiments of the present invention comprising camera calibration and display calibration.
Figure 4:
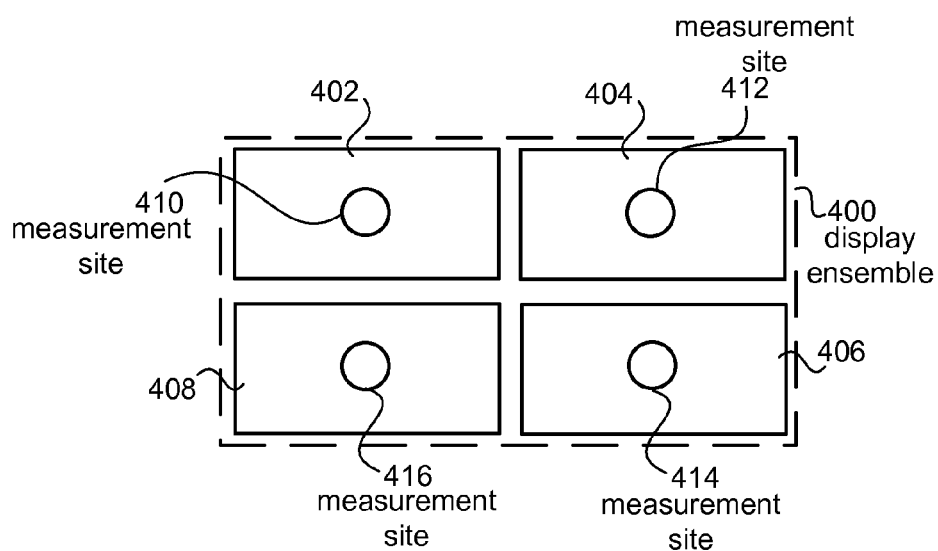
FIG. 4 is a picture illustrating an exemplary display ensemble comprising four displays and illustrating exemplary measurement sites associated with each display in the display ensemble.
Figure 5:
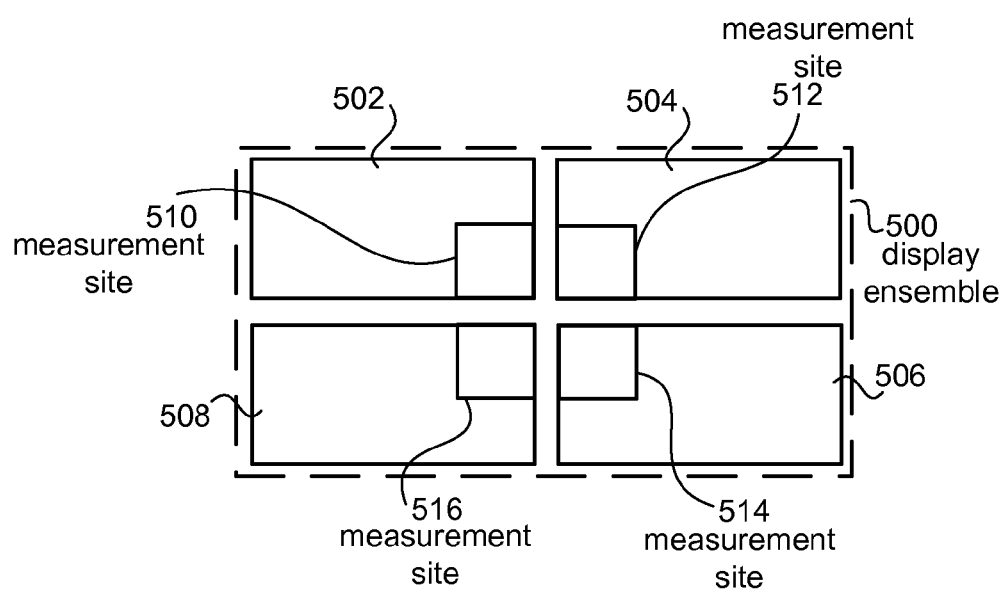
FIG. 5 is a picture illustrating an exemplary display ensemble comprising four displays and illustrating exemplary measurement sites associated with each display in the display ensemble.

Some embodiments of the present invention may be described in relation to FIG. 3. In these embodiments, a display-ensemble calibration program may initialize 302 the RGB Gamma 1D LUTs in each color display to an identity function, wherein the RGB values sent to the display device are equal to the input RGB values received by the color display. In alternative embodiments, the RGB Gamma 1D LUTs in each color display may be initialized 302 to an alternative function and appropriate compensation may be performed based on the known alternative initialization function. In yet alternative embodiments (not shown), the RGB Gamma 1D LUTs in each color display may not be initialized, but may be known. In these embodiments, an appropriate compensation may be performed based on the known function. In some embodiments of the present invention, when the RGB Gamma 1D LUTs are known, but do not comprise a mapping from the complete domain to the complete range of values, then initialization may be required. The display-ensemble calibration program may instruct a calibration computer to generate and send a command to a digital color camera effectuating the acquisition 304, by the digital color camera, of a dark-camera image of the display ensemble with all of the color displays in the display ensemble in a powered-down state under a normal lighting condition. In some embodiments of the present invention, the display-ensemble calibration program may provide a prompt to a user, for example, via a graphical user interface (GUI), via a textual user interface, or via another type of user interface, instructing the user to power down the display ensemble color displays and to set the lighting conditions to a normal lighting condition. In alternative embodiments, the display-ensemble calibration program may instruct the calibration computer to generate and send a command to a display-driver computer requesting the display-driver computer to power down the display ensemble displays. A summary dark-camera Red value, a summary dark-camera Green value and a summary dark-camera Blue value may be extracted from the acquired dark-camera image from a designated measurement site on each color display in the display ensemble. An exemplary summary value may be an average value of all respective values within a designated measurement site. In some embodiments of the present invention, a camera nonlinearity may be compensated for prior to determination of a summary value. FIG. 4 illustrates an exemplary display ensemble 400 containing four color displays 402, 404, 406, 408. An exemplary measurement site 410, 412, 414, 416 is illustrated on each of the color displays 402, 404, 406, 408, respectively. In this example, a measurement site is a circular region located in the central portion of an associated color display. FIG. 5 illustrates an alternative example of measurement sites 510, 512, 514, 516 for an exemplary display ensemble 500 containing four color displays 502, 504, 506, 508.

These examples are for illustrative purposes and are not intended as a limitation. The display-ensemble calibration program may store measurement-site identification information that facilitates the extraction, from the dark-camera image or other image of the display ensemble, of the RGB values of the camera image pixels located within the measurement sites. In an exemplary embodiment of the present invention, the measurement-site identification information may comprise a mask image, wherein measurement-site pixel values are a first fixed value and non-measurement-site pixel values are a second fixed value. In an alternative embodiment, measurement-site identification information may comprise values associated with a parametric description identifying a measurement site, for example the centers and radii of circular sites, describing the measurement-site locations relative to a readily identifiable origin within the image.

Referring again to FIG. 3, after the dark-camera image is obtained 304, camera calibration may be performed 306, and display calibration may be performed 308.

Figure 6:
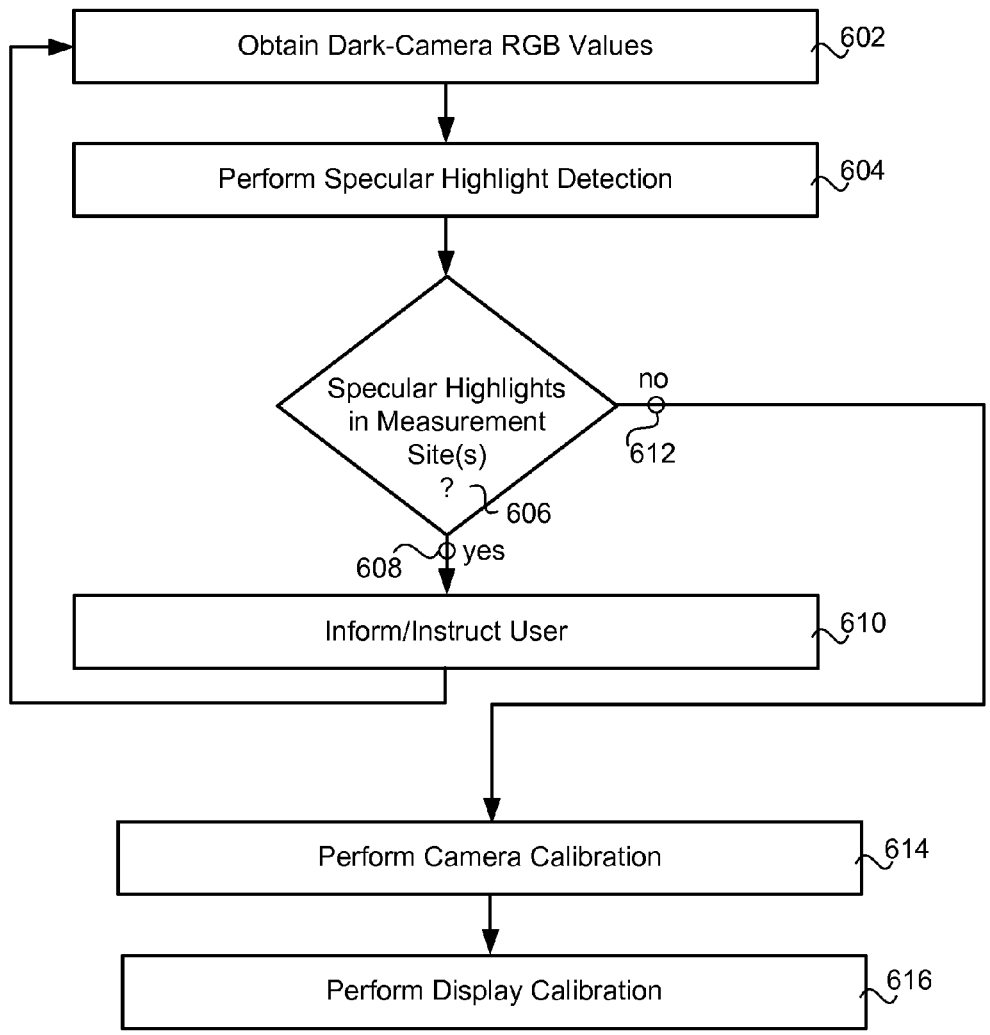
FIG. 6 is a chart depicting exemplary embodiments of the present invention comprising specular-highlight detection in a dark-camera image, wherein a user may be prompted to adjust the imaging geometry to eliminate the detected specular highlights.

In alternative embodiments of the present invention described in relation to FIG. 6, after the dark-camera image is obtained 602, specular highlight detection may be performed 604 to detect specular reflections of ambient lighting or bright objects that may appear in an image of the display ensemble. In some embodiments of the present invention, specular highlight detection may be performed 604 on the dark-camera image according to methods understood in the art. The detected specular highlight locations maybe examined 606 to determine if the specular highlights occur in a measurement site. If a specular highlight is detected in a measurement site 608, then a user may be informed and/or instructed to adjust the imaging geometry, for example, to move the color digital camera, to block, to turn off, or to move a specular-highlight generating object, for example, a light source or other specular-highlight generating object, to change the measurement site to a location that is not contaminated by a specular highlight or to make other adjustments to the imaging geometry. A dark-camera image may be obtained 602, and specular highlight detection may be performed 604 until a satisfactory dark-camera image is acquired 612. Camera calibration may be performed 614, and display calibration may be performed 616.

Figure 7:
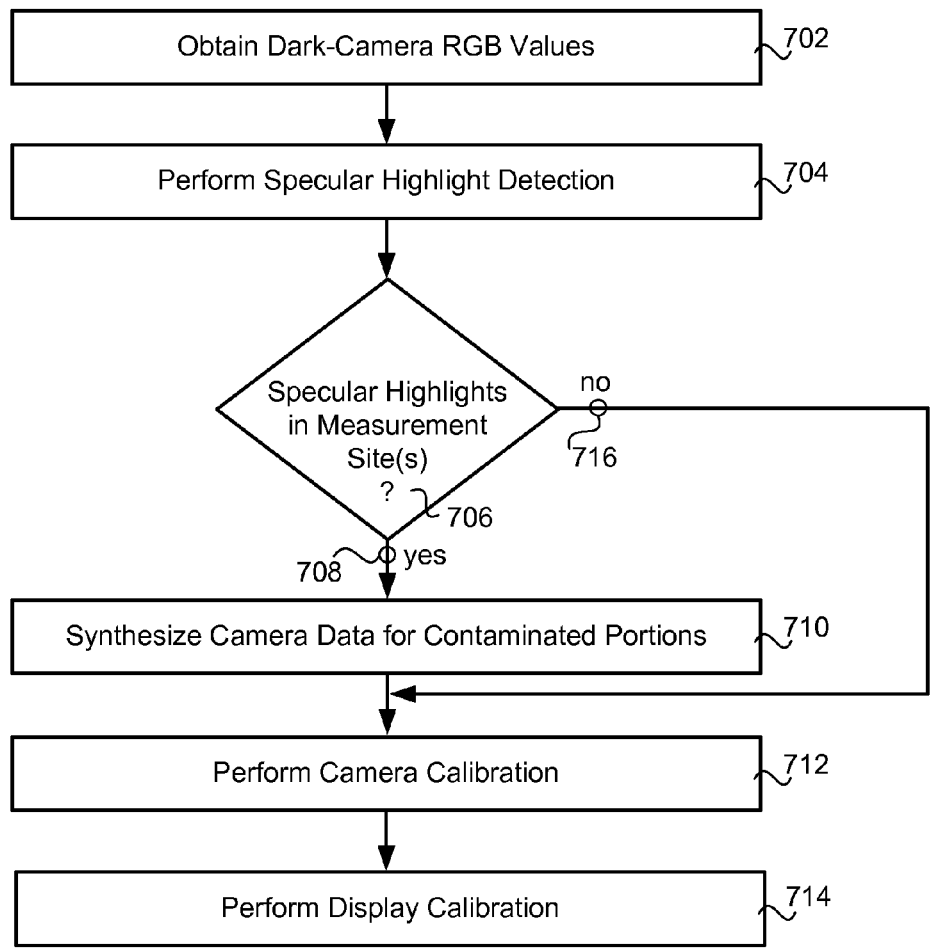
FIG. 7 is a chart depicting exemplary embodiments of the present invention comprising specular-highlight detection in a dark-camera image, wherein image portions contaminated by detected specular highlights may be synthesized or disregarded.

In yet alternative embodiments of the present invention described in relation to FIG. 7, after the dark-camera image is obtained 702, specular highlight detection may be performed 704 to detect specular reflections of ambient lighting or bright objects that may appear in an image of the display ensemble. In some embodiments of the present invention, specular highlight detection may be performed 704 on the dark-camera image according to methods understood in the art. The detected specular highlight locations maybe examined 706 to determine if the specular highlights occur in a measurement site. If a specular highlight is detected in a measurement site 708, then camera data may be synthesized for the portion of the dark-camera image contaminated by the specular highlights. In some embodiments of the present invention, nearby non-contaminated image regions may be used to estimate the camera data in the contamination regions. Camera calibration may be performed 712, and display calibration may be performed 714 after the data synthesis 710 or if there are no specular highlights detected in the measure sites. In alternative embodiments of the present invention, portions of the image contaminated by the specular highlights may be disregarded in subsequent processing.

Figure 8:
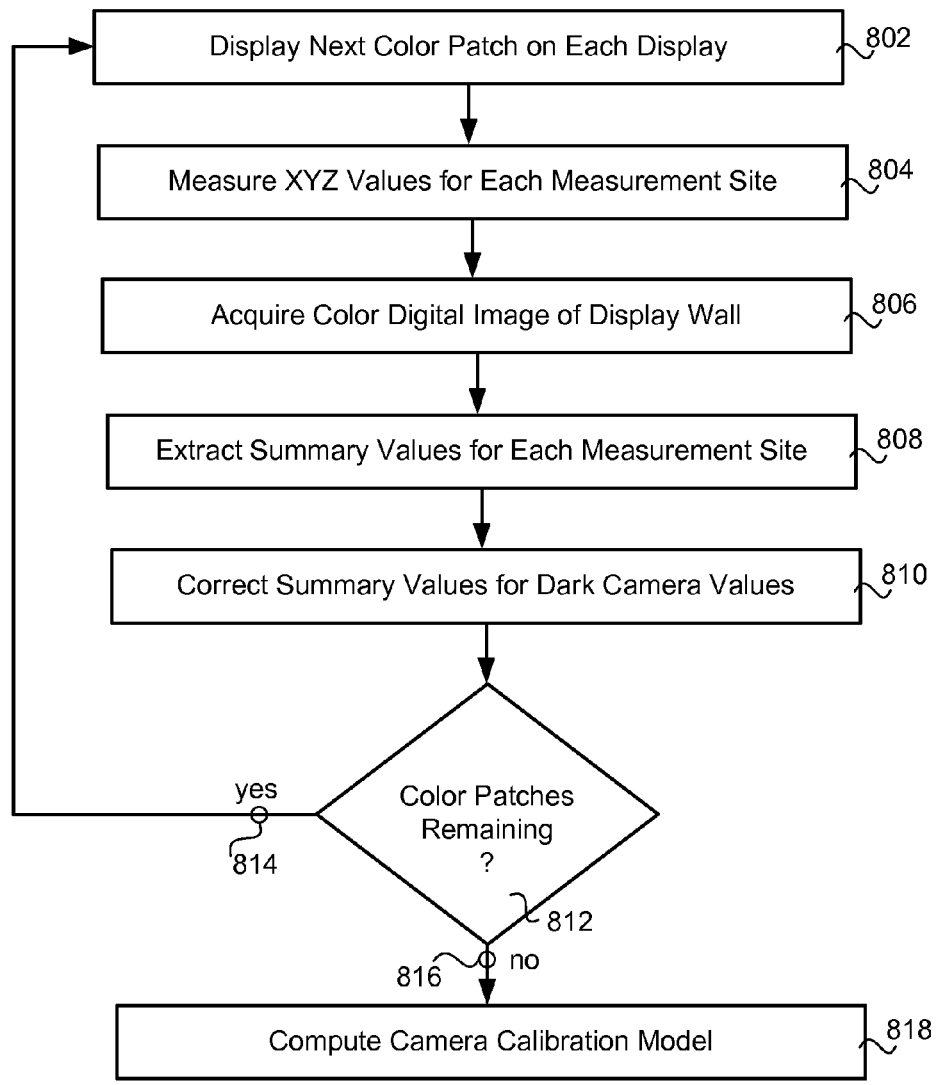
FIG. 8 is a chart depicting exemplary embodiments of camera calibration according to the present invention.

Camera calibration, according to some embodiments of the present invention, may be understood in relation to FIG. 8. A next color patch, from a plurality of camera-calibration color patches, may be displayed 802 on each color display, wherein each color display may be fully warmed up to thermal equilibrium with the environment. In some exemplary embodiments of the present invention, eight color patches may be displayed, in turn, on each color display in the measurement site associated with the color display. In some exemplary embodiments, the eight color patches may be color patches associated with the eight colors corresponding to the corners of the Red-Green-Blue color cube: that is, color patches of black, white, red, green, blue, cyan, magenta and yellow. In alternative exemplary embodiments, the plurality of camera-calibration color patches may comprise colors corresponding to a rectilinear, for example, a 5×5×5 or other rectilinear, sampling of the RGB color cube. In yet alternative exemplary embodiments, the plurality of camera-calibration color patches may comprise a second plurality of color patches associated with a sampling of the display gray line from black to white with R=G=B. In some embodiments, the gray-line sampling may be a uniform sampling. In alternative embodiments, the gray-line sampling may be a non-uniform sampling. Alternative embodiments of the present invention may comprise alternative camera-calibration color-patch colors.

Measured CIE XYZ, also referred to as XYZ, values may be obtained from a color-measurement device, for example, a colorimeter, a spectroradiometer or other instrument for measuring display color outputs, appropriately positioned to make a measurement 804 at each measurement site. The color-measurement device measured XYZ values may be denoted:

$$XYZ_{measured}^{(i,j)},$$

where (i, j) may denote the ith display and the jth color patch, and $XYZ_{measured}^{(i,j)}$ is a three-element vector containing the X, Y and Z values obtained by the color-measurement device.

The three color component values in a three-element color vector, for example, the red component, the green component and the blue component in an RGB vector and the X component, the Y component and the Z component in a CIE XYZ vector, may be collectively referred to as a value, for example, an RGB value and an XYZ value.

A color-patch image may be acquired 806 of the display ensemble, wherein each color display in the display ensemble is displaying, in the associated measurement site, the color patch. A summary value associated with a measurement region of a color display may be extracted 808. In an exemplary embodiment of the present invention, an average of the red (R) values, the green (G) values and the blue (B) values of the pixels located within a measurement site may be extracted 808 from the color-patch image. The summary values may be dark corrected 810 according to:

$$RGB_{CDC}^{(i,j)} = RGB_{CP}^{(i,j)} - RGB_{CD}^{(i,j)},$$

where each $RGB*^{(i,j)}$ is a three-element vector containing R, G and B values associated with the ith display and the jth color patch, and the identifiers CDC, CP and CD may denote the dark-corrected camera RGB values, the summary camera RGB values and the averaged dark camera RGB values, respectively.

A determination 812 may be made as to whether or not all of the color patches in the plurality of camera-calibration color patches have been displayed and whether or not the resulting color measurements and acquired color-patch images have been processed. If there are patches remaining to be displayed 814, then the next color patch may be displayed 802 on each color display, and the process may continue until there are no color patches remaining 816.

A camera calibration model may be computed 818 for each of the color displays within the display ensemble. A camera calibration model, for a particular color display, may convert dark-corrected camera RGB values into camera-model generated XYZ values. A general model form may be:

$$XYZ_C^{(i)} = F_{CM}^{(i)}(RGB_{CDC}^{(i)}),$$

where $RGB_{CDC}^{(i)}$ is a three-element vector containing dark-corrected camera RGB values associated with the ith display, $X_C^{(i)}$ is a three-element vector containing camera-model generated XYZ values associated with the ith display and $F_{CM}^{(i)}$ is a generic camera-calibration model function. In some exemplary embodiments, the camera-calibration model function may be a 3×3 matrix, which may be denoted $M_{CM}^{(i)}$ for the ith display. In these exemplary embodiments, the model form may be written:

$$XYZ_C^{(i)} = M_{CM}^{(i)} RGB_{CDC}^{(i)},$$

and in some exemplary embodiments, the matrix, $M_{CM}^{(i)}$, may be determined according to:

$$M_{CM}^{(i)} = \begin{bmatrix} X_{measured}^{(i,1)} & X_{measured}^{(i,2)} & \cdots & X_{measured}^{(i,N_C)} \\ Y_{measured}^{(i,1)} & Y_{measured}^{(i,2)} & \cdots & Y_{measured}^{(i,N_C)} \\ Z_{measured}^{(i,1)} & Z_{measured}^{(i,2)} & \cdots & Z_{measured}^{(i,N_C)} \end{bmatrix} / \begin{bmatrix} R_{CDC}^{(i,1)} & R_{CDC}^{(i,2)} & \cdots & R_{CDC}^{(i,N_C)} \\ G_{CDC}^{(i,1)} & G_{CDC}^{(i,2)} & \cdots & G_{CDC}^{(i,N_C)} \\ B_{CDC}^{(i,1)} & B_{CDC}^{(i,2)} & \cdots & B_{CDC}^{(i,N_C)} \end{bmatrix},$$

where $N_C$ may denote the number of camera-calibration color patches, $X_{measured}^{(i,j)}$, $Y_{measured}^{(i,j)}$ and $Z_{measured}^{(i,j)}$ may denote the X, Y and Z component values, respectively, of $XYZ_{measured}^{(i,j)}$ for j=1, ..., $N_C$ and $R_{CDC}^{(i,j)}$, $G_{CDC}^{(i,j)}$ and $B_{CDC}^{(i,j)}$ may denote the R, G and B component values, respectively, of $RGB_{CDC}^{(i,j)}$ for j=1, ..., $N_C$ and •/• may denote a matrix right division function, for example, such as provided by the MATLAB programming language. Alternative regression methods may be used to estimate $M_{CM}^{(i)}$ in alternative embodiments of the present invention. In alternative embodiments, the camera may not be modeled by a linear model, and a generic camera-calibration model function, $F_{CM}^{(i)}$, may be estimated.

After a camera calibration is performed and a camera model is computed for each color display, a display calibration may be performed.

Figure 9A:
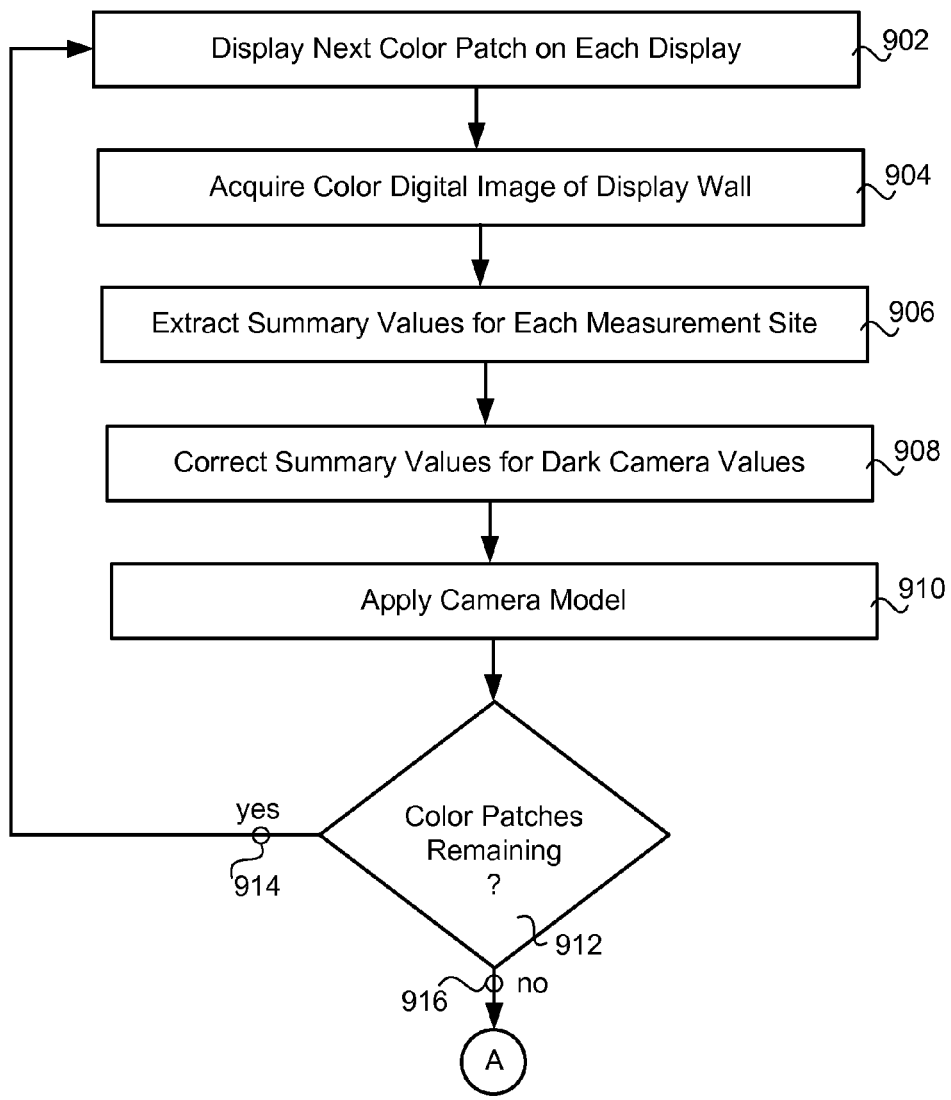
FIG. 9A and FIG. 9B are a chart depicting exemplary embodiments of display calibration according to the present invention.
Figure 9B:
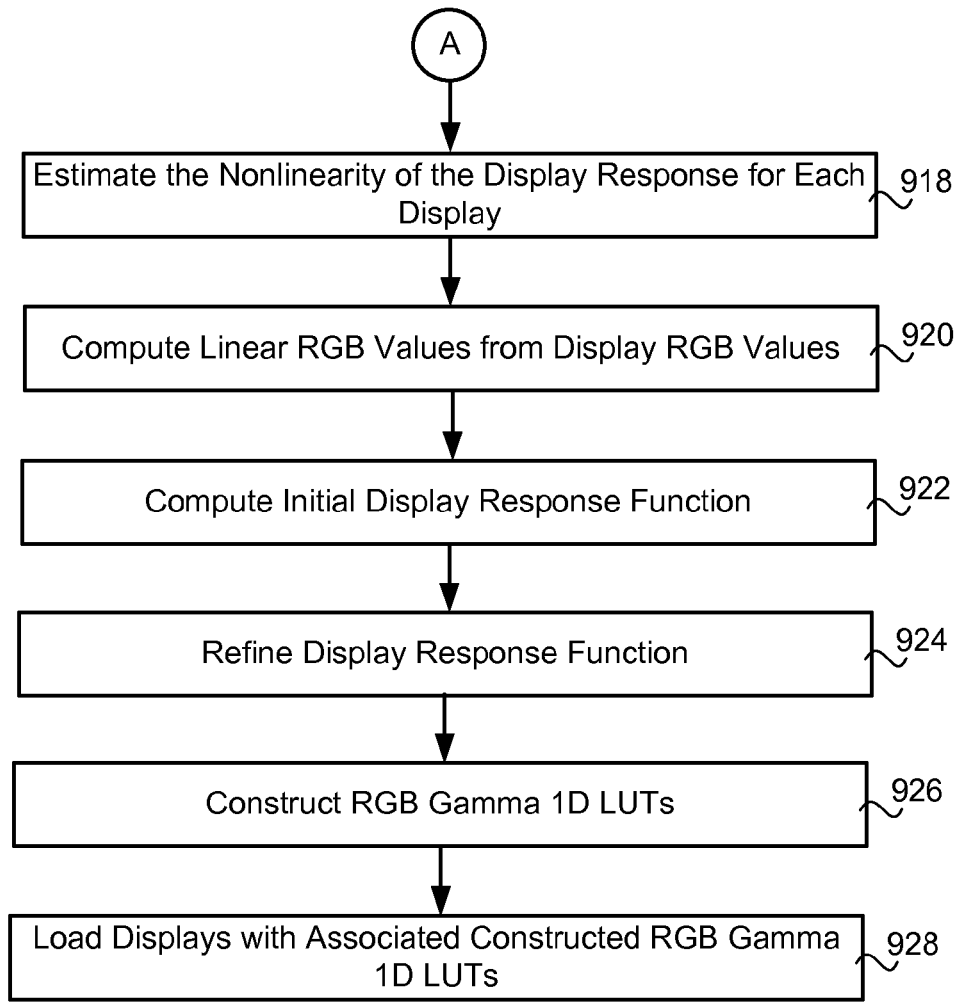

Display calibration, according to some embodiments of the present invention, may be understood in relation to FIG. 9A and FIG. 9B. A next color patch, from a plurality of display-calibration color patches, may be displayed 902 on each color display in a display ensemble, wherein each color display may be fully warmed up to thermal equilibrium with the environment. In some exemplary embodiments of the present invention, twelve color patches may be displayed, in turn, on each color display in the measurement site associated with the color display. In some exemplary embodiments of the present invention, of the twelve color patches, nine color patches may correspond to a sampling of the gray line from black to white with R=G=B. In some embodiments, the gray-line sampling may be a uniform sampling. In alternative embodiments, the gray-line sampling may be a non-uniform sampling. In these exemplary embodiments, the other three color patches may be the pure red, pure green and pure blue primaries of the display device, at their maximum signal levels.

A color-patch image may be acquired 904 of the display ensemble, wherein each color display in the display ensemble is displaying the color patch. A summary value associated with a measurement region of a color display may be extracted 906. In an exemplary embodiment of the present invention, an average of the red (R) values, the green (G) values and the blue (B) values of the pixels located within a measurement site may be extracted 906 from the color-patch image. The summary values may be dark corrected 908 according to:

$$RGB_{CDC}^{(i,j)} = RGB_{CP}^{(i,j)} - RGB_{CD}^{(i,j)},$$

where each $RGB*^{(i,j)}$ is a three-element vector containing R, G and B values associated with the ith color display and the jth color patch, and the identifiers CDC, CP and CD may denote the dark-corrected camera RGB values, the summary camera RGB values and the averaged dark camera RGB values, respectively.

For each color display, the previously computed camera calibration model, $F_{CM}^{(i)}$, may be applied 910 to the dark-corrected camera RGB values, thereby generating camera-model generated XYZ values according to:

$$XYZ_{C1}=F_{CM}^{(i,j)}(RGB_{CP}^{(i,j)}-RGB_{CD}^{(i)}),$$

where $XYZ_{C1}^{(i,j)}$ denotes a three-element vector containing the camera-model generated XYZ values for the ith color display and the jth color patch associated with a first display-calibration pass, $RGB_{CP}^{(i,j)}$ denotes a three-element vector containing the summary RGB values, for the measurement region of the ith color display, for the jth color patch, and $RGB_{CD}^{(i)}$ denotes a three-element vector containing the dark camera RGB values for the ith color display, thus making $(RGB_{CP}^{(i,j)}-RGB_{CP}^{(i)})$ the dark-camera corrected, summary values.

A determination 912 may be made as to whether, or not, all of the color patches in the plurality of display-calibration color patches have been displayed and the resulting color image processed. If there are patches remaining to be displayed 914, then the next color patch may be displayed 902 on each color display, and the process may continue until there are no color patches remaining 916.

When all of the color patches in the plurality of display-calibration color patches have been displayed and the resulting camera-acquired images have been processed to obtain camera-model generated XYZ values, then the RGB values of the nine gray patches and the corresponding camera-model generated Y values may be used to estimate 918 the nonlinearity of each display response, thereby generating 1-Dimensional (1D) display tone response functions, which may be used to compute 920 linear RGB values from the input display RGB values, with respect to the camera measured Y values. In the exemplary embodiments of the present invention wherein nine gray patches with R=G=B may be used to estimate the nonlinear luminance (Y) response of the display device to input gray signals with R=G=B, all three functions, $F_{RL}^{(i)}(\bullet)$, $F_{GL}^{(i)}(\bullet)$, $F_{BL}^{(i)}(\bullet)$, may be the same function. The linear RGB values, therefore, may be determined, from the input display RGB values, which may be denoted $R_P^j$, $G_P^j$ and $B_P^j$ for the jth color patch, according to:

$$R_L^{(i,j)}=F_{RL}^{(i)}(R_P^j), G_L^{(i,j)} \text{ and } B_L^{(i,j)}=F_{BL}^{(i)}(B_P^{(j)}),$$

where $R_L^{(i,j)}$, $G_{hu(i,j)}$ and $B_L^{(i,j)}$ may denote the linear Red, Green and Blue values, respectively, associated with the ith color display and the jth color patch.

In alternative embodiments of the present invention, the nonlinear response of the display device may be estimated with respect to alternative components of the XYZ triad. In yet alternative embodiments of the present invention, colorimeter-measured XYZ values along the gray line obtained during the camera-calibration process may be used to estimate the nonlinear response of a display device.

In some exemplary embodiments of the present invention, an initial display response function may be computed 922, using the camera-model generated XYZ values and the linear display RGB values, wherein the initial display response function may be modeled as the application of a 3×3 matrix, which may be denoted $M_{DM}^{(i)}$ for the ith color display, to the linear display RGB values. The model form may be written:

$$XYZ_{C1}^{(i)}=M_{DM}^{(i)}RGB_L^{(i)},$$

and in some exemplary embodiments, the matrix, $M_{DM}^{(i)}$, may be determined according to:

$$M_{DM}^{(i)} = \begin{bmatrix} X_{C1}^{(i,1)} & X_{C1}^{(i,2)} & \ldots & X_{C1}^{(i,N_D)} \\ Y_{C1}^{(i,1)} & Y_{C1}^{(i,2)} & \ldots & Y_{C1}^{(i,N_D)} \\ Z_{C1}^{(i,1)} & Z_{C1}^{(i,2)} & \ldots & Z_{C1}^{(i,N_D)} \end{bmatrix} / \begin{bmatrix} R_L^{(i,1)} & R_L^{(i,2)} & \ldots & R_L^{(i,N_D)} \\ G_L^{(i,1)} & G_L^{(i,2)} & \ldots & G_L^{(i,N_D)} \\ B_L^{(i,1)} & B_L^{(i,2)} & \ldots & B_L^{(i,N_D)} \end{bmatrix},$$

where $N_D$ may denote the number of display-calibration color patches, $X_{C1}^{(i,j)}$, $Y_{C1}^{(i,j)}$ and $Z_{C1}^{(i,j)}$ may denote the X, Y and Z components, respectively, of $XYZ_{C1}^{(i,j)}$ for j=1, ..., $N_D$ and $R_L^{(i,j)}$, $G_L^{(i,j)}$ and $B_L^{(i,j)}$ may denote the R, G and B components, respectively, of $RGB_L^{(i,j)}$ for j=1, ..., $N_D$ and •/• may denote a matrix right division function, for example, such as is provided by the MATLAB programming language. Alternative regression methods may be used to estimate $M_{DM}^{(i)}$ in alternative embodiments of the present invention. In alternative embodiments, a display may not be modeled by a linear model, and a generic display model function, $F_{DM}^{(i)}$, may be estimated. In some embodiments of the present invention, a display model function, $F_{DM}^{(i)}$, may be formulated as a color separation model followed by an n-primaries-to-XYZ model to more accurately model an n-channel display device. In some of these embodiments, the color separation model may be known from a display manufacturer. In alternative of these embodiments, the color separation model may be estimated.

With a computed initial display response, $F_{DM}^{(i)}$, given a linear RGB value, a display XYZ value may be estimated for the ith color display according to:

$$\begin{bmatrix} X_C^{(i)} \\ Y_C^{(i)} \\ Z_C^{(i)} \end{bmatrix} = F_{DM}^{(i)}\left(\begin{bmatrix} R_L^{(i)} \\ G_L^{(i)} \\ B_L^{(i)} \end{bmatrix}\right)$$

and, given a displayed XYZ value, a linear RGB value may be estimated for the ith color display according to:

$$\begin{bmatrix} R_L^{(i)} \\ G_L^{(i)} \\ B_L^{(i)} \end{bmatrix} = (F_{DM}^{(i)})^{-1}\left(\begin{bmatrix} X_C^{(i)} \\ Y_C^{(i)} \\ Z_C^{(i)} \end{bmatrix}\right).$$

Figure 10A:
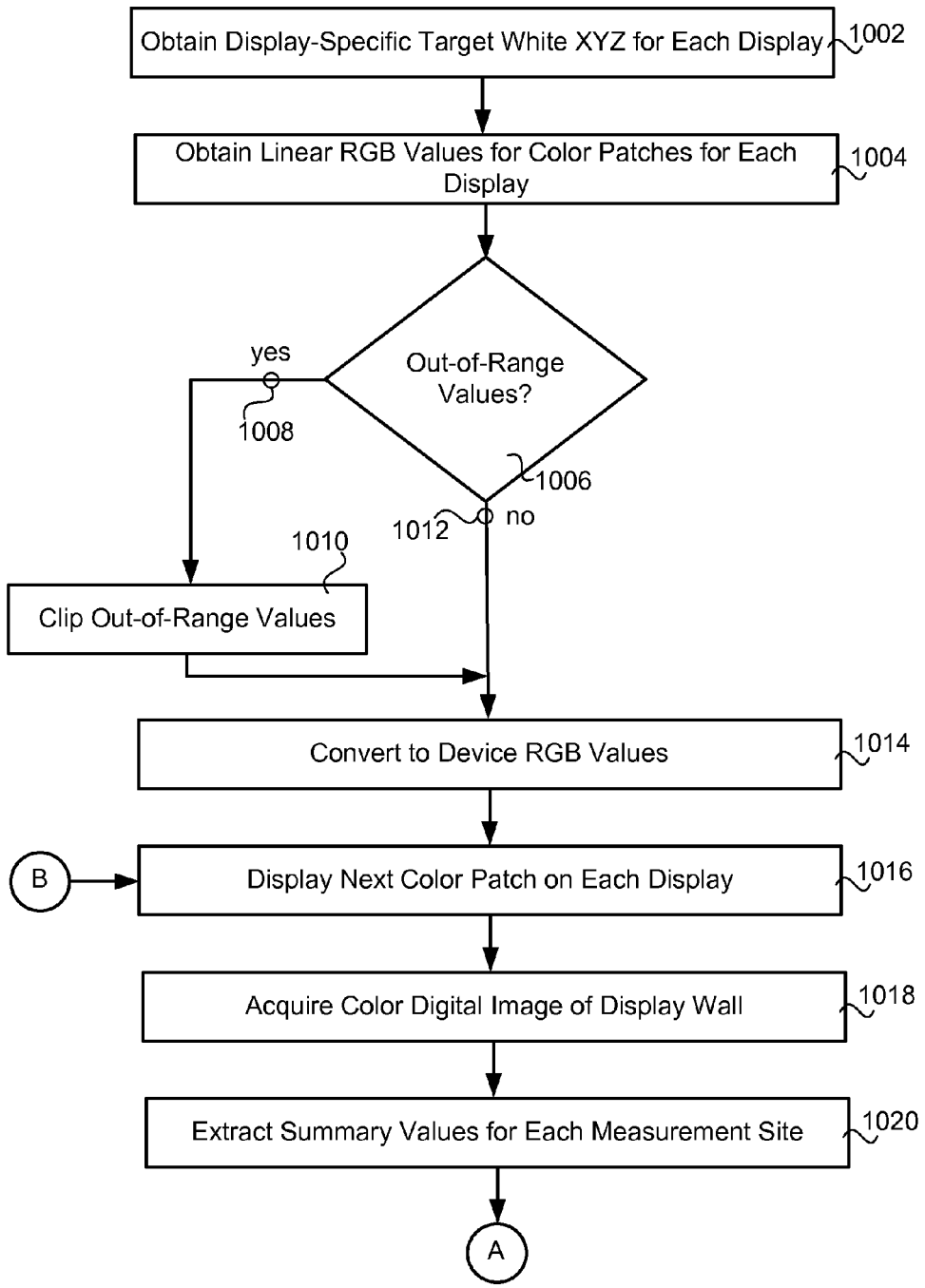
FIG. 10A and FIG. 10B are a chart depicting exemplary embodiments of display calibration refinement according to the present invention.
Figure 10B:
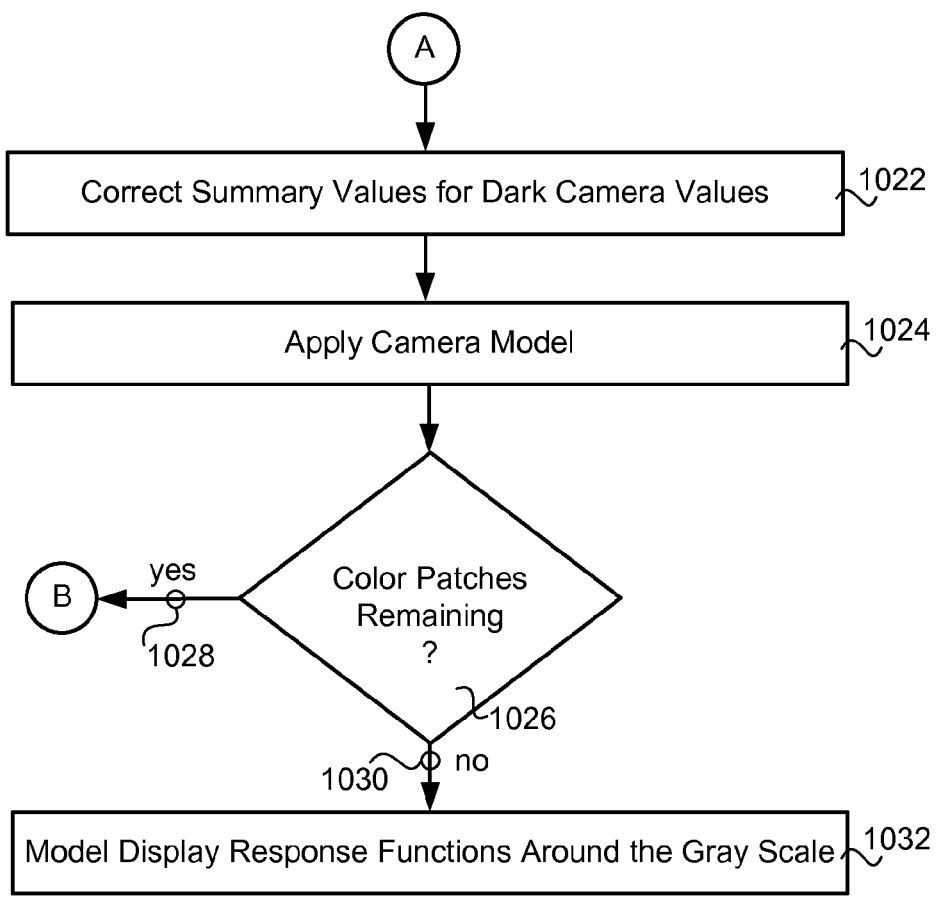

The initial display response function for each color display may be refined 924. In some embodiments of the present invention, the refinement of an initial display response for a color display may be described in relation to FIG. 10A and FIG. 10B. In some embodiments of the present invention, a desired white point chromaticity for each display may be specified by user input. In alternative embodiments, a default white point chromaticity may be used. The camera-model generated Y value obtained in the first pass for the equi-RGB white patch may be combined with the desired (x, y) white point chromaticity to obtain 1002 a display-specific target white XYZ, which may not necessarily be realizable, for each color display, which may be denoted $XYZ_W^{(i)}=[X_W^{(i)} Y_W^{(i)} Z_W^{(i)}]^T$ for the ith color display, where T denotes the vector transpose operation.

The display-specific target white XYZ for each color display may be used to obtain 1004 linear RGB values for a plurality of refinement color patches defined in a particular color space. In some embodiments of the present invention, the plurality of color patches may be defined in a perceptually uniform color space. In some embodiments, described herein, an Lab color space may be used. In alternative embodiments of the present invention, an alternative perceptually uniform color space may be used. In yet alternative embodiments, a perceptually non-uniform color space may be used. In some embodiments of the present invention, the plurality of refinement color patches may comprise forty-seven color patches. Fifteen of the forty-seven refinement color patches may be obtained by uniformly sampling the neutral Lab gray line with a=b=0. These Lab coordinates are calculated with respect to the display-specific target white XYZ for each display, not with respect to the native XYZ produced by the display device in response to the equi-RGB white signal. Eight of the forty-seven refinement color patches may be obtained by uniformly sampling L with a=10 and b=0. Eight of the forty-seven refinement color patches may be obtained by uniformly sampling L with a=10 and b=0. Eight of the forty-seven refinement color patches may be obtained by uniformly sampling L with a=0 and b=10. Eight of the forty-seven refinement color patches may be obtained by uniformly sampling L with a=0 and b=10. The linear RGB values for the jth color patch and for the ith color display may be determined according to:

$$\begin{bmatrix} R_L^{(i,j)} \\ G_L^{(i,j)} \\ B_L^{(i,j)} \end{bmatrix} = (F_{DM}^{(i)})^{-1} \left( F_{Lab \to XYZ} \left( \begin{bmatrix} L^{(j)} \\ a^{(j)} \\ b^{(j)} \end{bmatrix}, \begin{bmatrix} X_W^{(i)} \\ Y_W^{(i)} \\ Z_W^{(i)} \end{bmatrix} \right) \right),$$

where $F_{Lab \to XYZ}(\bullet,\bullet)$ denotes the standard CIE Lab-to-XYZ conversion function.

Since the display-specific target white point may be different from the native device white point of a display, the linear RGB values may be examined 1006 to determine if a linear RGB value is out of range. If a linear RGB value is out of range 1008, then the linear RGB value may be clipped 1010. In some embodiments of the present invention, an out-of-gamut linear RGB value may be clipped to the boundary of the gamut while substantially preserving the hue of the color. In some embodiments of the present invention, clipping may be performed according to:

$$\begin{bmatrix} R_{CL}^{(i,j)} \\ G_{CL}^{(i,j)} \\ B_{CL}^{(i,j)} \end{bmatrix} = F_{Clip} \left( \begin{bmatrix} R_L^{(i,j)} \\ G_L^{(i,j)} \\ B_L^{(i,j)} \end{bmatrix} \right),$$

where $R_{CL}^{(i,j)}$, $G_{CL}^{(i,j)}$ and $B_{CL}^{(i,j)}$ may denote the clipped RGB values and $F_{Clip}$ may denote a clipping function that clips a point that falls outside the unit cube to a point on the surface of the unit cube, wherein the point on the surface of the unit cube is on a line that passes through the center of the unit cube and the point that falls outside the unit cube. In alternative embodiments of the present invention, $F_{Clip}$ may denote a clipping function that may clip a point that falls outside the unit cube to a point on the surface of the unit cube, wherein the point on the surface of the unit cube is on a line that passes through the unit-cube vertex corresponding to black (R=G=B=0) and the point that falls outside the unit cube. In yet alternative embodiments of the present invention, other clipping functions known in the art may be used to clip an out-of-gamut linear RGB value to the boundary of the gamut while substantially preserving the hue of the color.

The in-range, realizable RGB values, either those resulting from clipping 1010 or those initially in-range 1012, may be converted 1014 to device RGB values for display by applying the inverse of the display tone response function obtained in the determination of the initial display model:

$$R_P^{(i,j)} = (F_{RL}^{(i)})^{-1}(R_{CL}^{(i,j)}), G_P^{(i,j)} = (F_{GL}^{(i)})^{-1}(G_{CL}^{(i,j)})$$
$$\text{and } B_P^{(i,j)} = (F_{BL}^{(i)})^{-1}(B_{CL}^{(i,j)}),$$

where $R_P^{(i,j)}$, $G_P^{(i,j)}$ and $B_P^{(i,j)}$ denote the RGB, respectively, device values for the ith color display and the jth refinement color patch.

The next color patch may be displayed 1016 on each color display in the display ensemble, and a color-patch image, associated with the jth refinement color patch, may be acquired 1018. A summary value associated with a measurement region of a color display may be extracted 1020. In an exemplary embodiment of the present invention, an average of the red (R) values, the green (G) values and the blue (B) values of the camera-image pixels located within a measurement site may be extracted 1020 from the color-patch camera image. The summary values may be dark corrected 1022 according to:
$$RGB_{CDC}^{(i,j)} = RGB_{CP}^{(i,j)} - RGB_{CD}^{(i,j)},$$
where each $RGB*^{(i,j)}$ is a three-element vector containing R, G and B values associated with the ith color display and the jth color patch, and the identifiers CDC, CP and CD may denote the dark-corrected camera RGB values, the summary camera RGB values and the averaged dark camera RGB values, respectively.

For each color display, the previously computed camera calibration model, $F_{CM}^{(i)}$, may be applied 1024 to the dark-corrected camera RGB values, thereby generating camera-model generated XYZ values according to:

$$XYZ_{C2}^{(i,j)} = F_{CM}^{(i)}(RGB_{CP}^{(i,j)} - RGB_{CD}^{(i)}),$$

where $XYZ_{C2}^{(i,j)}$ denotes a three-element vector containing the camera-model generated XYZ values for the ith color display and the jth color patch associated with the refinement display-calibration pass, $RGB_{CP}^{i,j}$ denotes a three-element vector containing the summary RGB values, for the measurement region of the ith color display, for the jth refinement color patch, and $RGB_{CD}^{(i)}$ denotes a three-element vector containing the dark camera RGB values for the ith color display, thus making $(RGB_{CP}^{(i,j)} - RGB_{CD}^{(i)})$ the dark-camera corrected, summary values.

A determination 1026 may be made as to whether, or not, all of the color patches in the plurality of refinement color patches have been displayed and the resulting color image processed. If there are patches remaining to be displayed 1028, then the next color patch may be displayed 1016 on each color display, and the process may continue until there are no color patches remaining 1030.

When all of the color patches in the plurality of refinement color patches have been displayed and the resulting camera-acquired images have been processed 1030 to obtain camera-model generated XYZ values for the refinement display-calibration pass, then the camera-model generated XYZ values may be used to model 1032 display functions around the gray scale. In some embodiments of the present invention, due to the irregularity of the camera-model generated XYZ points, the XYZ points, associated with a display, may be tessellated into tetrahedra for the display. In some embodiments of the present invention the Delaunay tessellation algorithm may be used to form the tetrahedra. In some of these embodiments, the MATLAB function "delaunayn" may be used to effectuate the Delaunay tessellation.

For each of a plurality of desired neutral colors, with XYZ specified, the tetrahedra associated with a particular color display may be searched to determine if the color is within one of the tetrahedra. If the color is in one of the tetrahedra, then the color is within the display gamut of the color display. If the color is not in one of the tetrahedra, then the color is not within the display gamut of the color display, and is thus, not realizable by the color display. If the color is within the display gamut of the color display, then tetrahedral (barycentric) interpolation may be used to obtain the linear RGB value for the color. By applying the inverse of the display tone response functions, the display RGB values may be obtained from the linear RGB values.

In alternative embodiments of the present invention, XYZ values may be converted to an alternative color space, and tessellation may occur in the alternative color space, for example, an Lab color space.

Figure 11:
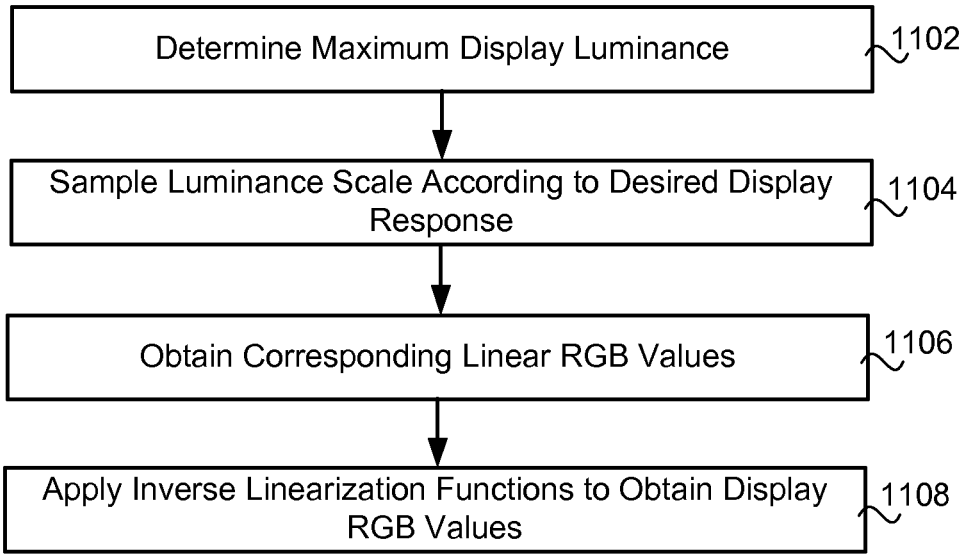
FIG. 11 is a chart depicting exemplary embodiments of look-up-table construction according to the present invention.

Referring again to FIG. 9B, the RGB Gamma 1D LUTs for each color display may be constructed 926 and loaded 928 into the respective color display. In some embodiments of the present invention described in relation to FIG. 11, a maximum achievable display-ensemble luminance (Y) value, may be determined 1102, wherein the maximum achievable display-ensemble luminance is the maximum display luminance value, that may be jointly achievable on all of the color displays in the display ensemble, having the desired chromaticity.

In some embodiments of the present invention, the maximum achievable display-ensemble luminance value may be determined 1102 by gradually increasing the luminance value with the white point chromaticity fixed, and using the XYZ, or other color-space, tessellation obtained, for each display, in the refinement display-calibration pass to test whether, or not, the color is realizable, on each color display. In some embodiments, a starting point from which the luminance value may be gradually increased may be a point associated with a color with the desired white/gray chromaticity that is close to the black point.

In alternative embodiments, the maximum achievable display luminance value may be determined 1102 by gradually moving down the gray line from a point outside the gamut, for example, the native white luminance, of the display, at the desired chromaticity, until the gamut is just entered.

Alternative embodiments may comprise a Digital Differential Analyzer (DDA) approach, a clipping-divider approach or another approach known in the art.

After the maximum achievable display-ensemble luminance value has been determined 1102, then the luminance (Y) scale may be sampled 1104, in some embodiments of the present invention, according to the desired tone response function, or other desired display response curve shape, from zero to the maximum achievable display-ensemble luminance value using the number of look-up-table points desired for the 1D look-up tables. In alternative embodiments, a number of sample points less than the total number of look-up-table points desired may be used, and points at locations not corresponding to sample points may be interpolated or approximated to achieve the desired number of look-up-table points. In some embodiments of the present invention, the look-up-table indices may be mapped uniformly onto the interval zero to one. The desired tone response function may be sampled based on the mapped indices, thereby producing a plurality of sample locations for sampling the zero-to-maximum-achievable-display-ensemble-luminance range. The sampled luminance values may be combined with the desired white-point chromaticity, and tetrahedral interpolation using the XYZ, or other color-space, tessellation obtained, for each display, in the refinement display-calibration pass may be used to obtain 1106 the corresponding linear RGB values for each display. By applying 1108 the inverse of the display tone response functions, the display RGB values may be obtained from the linear RGB values. The entries of the RGB Gamma 1D LUTs for each display are the display RGB values constructed for the associated display.

Figure 12:
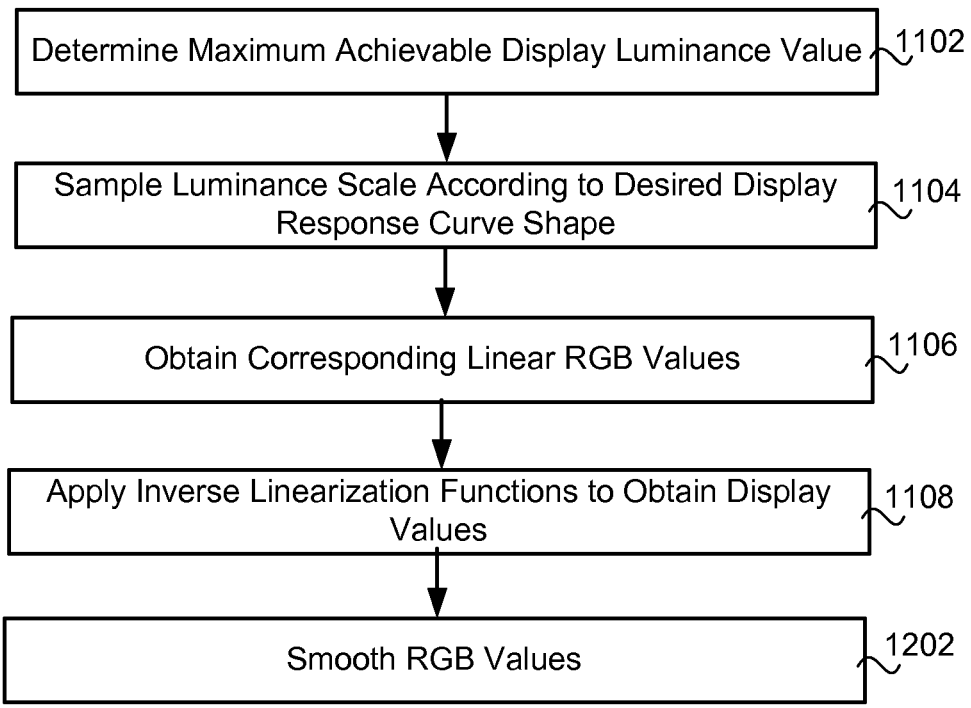
FIG. 12 is a chart depicting exemplary embodiments, according to the present invention, of look-up-table construction comprising smoothing of the look-up-table entries.

In some embodiments of the present invention described in relation to FIG. 12, the display RGB values may be smoothed 1202.

Figure 13:
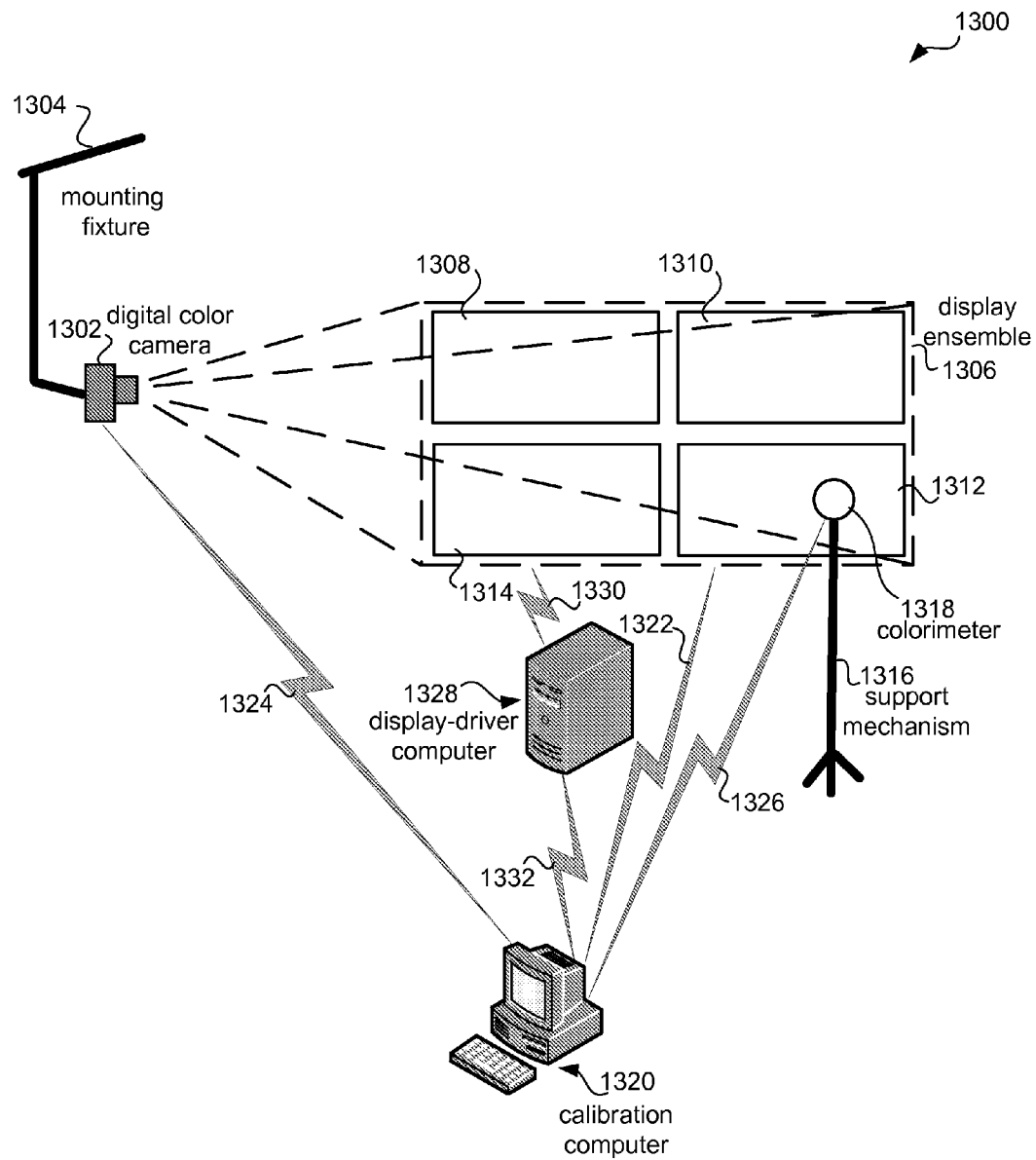
FIG. 13 is a picture illustrating exemplary embodiments of the present invention comprising a display ensemble, a permanently mounted digital color camera, a color-measurement device located on a support mechanism, a display-driver computer and a calibration computer.

FIG. 13 depicts an exemplary alternative system architecture 1300 according to some embodiments of the present invention. A digital color camera 1302 may be mounted on a permanent mounting fixture 1304 located at a fixed location relative to the digital color camera 1302, whereat the digital color camera 1302 may acquire a full view of a display ensemble 1306.

In some embodiments of the present invention, a full view may be acquired as a single image, wherein the display ensemble 1306 may be entirely contained in the digital color camera 1302 field-of-view. In alternative embodiments of the present invention, a full view may be acquired through a panning, or other camera-movement, operation wherein multiple, partial views of the display ensemble 1306 are acquired, and wherein the partial views may be combined into a single, full-view image according to methods understood in the art. In some exemplary embodiments, the digital color camera 1302 may be mounted from the ceiling. The display ensemble 1306 may consist of multiple (four shown, 1308, 1310, 1312, 1314) color displays, each of which may comprise a color display apparatus, comprising a color display device together with a set of downloadable Gamma 1D LUTs, wherein the Gamma 1D LUTs process RGB signals received by the color display apparatus, and the processed RGB signals drive the color display device. A support mechanism 1316 may be used for placing a colorimeter 1318, or other instrument for measuring display color outputs, so that the colorimeter 1318, or other instrument for measuring display color outputs, individually senses each color display 1308, 1310, 1312, 1314 to measure the respective display's output colors. Exemplary colorimeters include X-Rite's EyeOne Display 2 and Datacolor's Spyder 3.

The color displays 1308, 1310, 1312, 1314 in the display ensemble 1306, the digital color camera 1302 and the colorimeter 1318 may be connected to a calibration computer 1320 via wired, wireless or other communication links 1322, 1324, 1326. A display-driver computer 1328 may be used to drive, via a wired, wireless or other communication link 1330 for graphics and video data transmission, the display ensemble 1306. In some embodiments of the present invention, the display-driver computer 1328 may be a single computer. In alternative embodiments (not shown), the display-driver computer may comprise a computing system, wherein a plurality of driver computers may be supervised by a coordinating computer to drive all of the color displays. In some of these alternative embodiments, the computing system may comprise one, or more, set-top boxes. In some embodiments of the present invention (shown), the display-driver computer 1328 and the calibration computer 1320 may be distinct computer systems. In these embodiments wherein the display-driver computer 1328 and the calibration computer 1320 are distinct computer systems, the display-driver computer 1328 and the calibration computer 1320 may be linked via a wired, wireless or other communication link 1332. Exemplary communication links include a serial communication link via a serial port, a USB link, an Ethernet link and other wired and wireless communication links In alternative embodiments of the present invention (not shown), one computer system may drive the display ensemble 1306 and function as the calibration computer.

A display-ensemble calibration program may reside on a non-transitory computer program product comprising a computer-readable storage medium having instructions stored thereon/in which may be used to program the calibration computer 1320. The display-ensemble calibration program may instruct the calibration computer 1320 to generate and send a command to the digital color camera 1302 effectuating the acquisition, by the digital color camera 1302, of an image of the display ensemble 1306. The display-ensemble calibration program may instruct the calibration computer 1320 to generate and send a command to the colorimeter 1318 effectuating the acquisition of a color measurement on a particular color display 1308, 1310, 1312, 1314. The display-ensemble calibration program may prompt a user to reposition the colorimeter 1318 for subsequent color measurements. The display-ensemble calibration program may instruct the calibration computer 1320 to generate and send a command to instruct the display-driver computer 1328 to drive the display ensemble 1306 to display one color patch of a plurality of color patches on a particular color display 1308, 1310, 1312, 1314. The display-ensemble calibration program may collect and process image data and measurement data to generate camera calibration models for all, or some, of the color displays 1308, 1310, 1312, 1314 in the display ensemble 1306; to collect and process image data from the digital color camera 1302 to generate a Red, a Green or a Blue Gamma 1D look-up table (LUT), collectively referred to as RGB Gamma 1D LUTs, for one, or more, of the color displays 1308, 1310, 1312, 1314 in the display ensemble 1306; and to download the RGB Gamma 1D LUTs associated with a particular color display to the color display 1308, 1310, 1312, 1314 in the display ensemble 1306.

Figure 14:
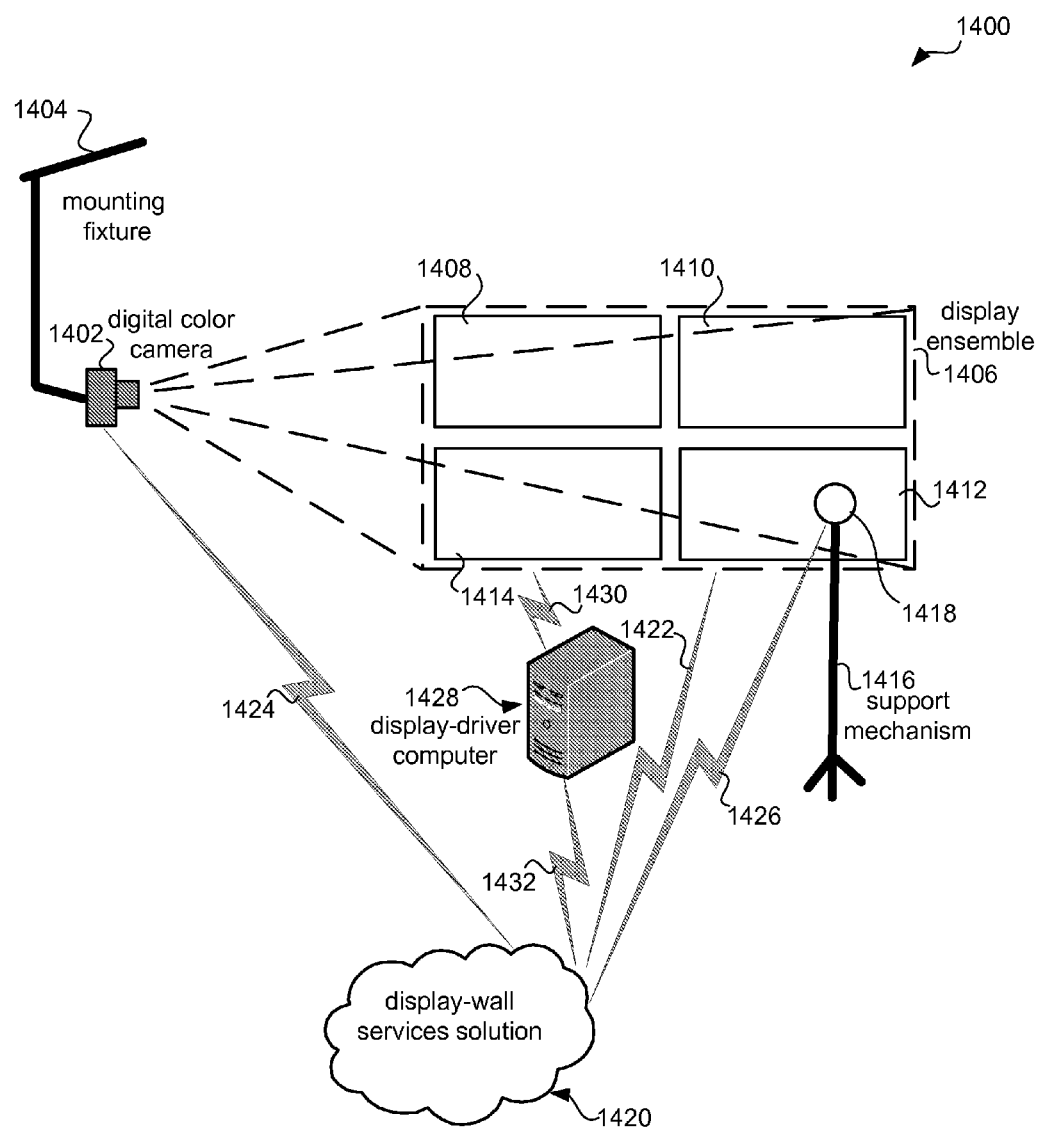
FIG. 14 is a picture illustrating exemplary embodiments of the present invention comprising a display ensemble, a permanently mounted digital color camera, a color-measurement device located on a support mechanism, a display-driver computer and a display-ensemble services solution in a cloud computing environment.

FIG. 14 depicts an alternative exemplary system architecture 1400 according to some embodiments of the present invention. A digital color camera 1402 may be mounted on a permanent mounting fixture 1404 located at a fixed location relative to the digital color camera 1402, whereat the digital color camera 1402 may acquire a full view of a display ensemble 1406. In some embodiments of the present invention, a full view may be acquired as a single image, wherein the display ensemble 1406 may be entirely contained in the digital color camera 1402 field-of-view. In alternative embodiments of the present invention, a full view may be acquired through a panning, or other camera-movement, operation wherein multiple, partial views of the display ensemble 1406 are acquired, and wherein the partial views may be combined into a single, full-view image according to methods understood in the art. In some exemplary embodiments, the digital color camera 1402 may be mounted from the ceiling. The display ensemble 1406 may consist of multiple (four shown, 1408, 1410, 1412, 1414) color displays. A support mechanism 1416 may be used for placing a colorimeter 1418, or other instrument for measuring display color outputs, onto the surface of each color display 1408, 1410, 1412, 1414 to measure the respective display's output colors. Exemplary colorimeters include X-Rite's EyeOne Display 2 and Datacolor's Spyder 3.

The color displays 1408, 1410, 1412, 1414 in the display ensemble 1406, the digital color camera 1402 and the colorimeter 1418 may be connected to a cloud-based display-ensemble service solution 1420 via wired, wireless or other communication links 1422, 1424, 1426. A display-driver computer 1428 may be used to drive, via a wired, wireless or other communication link 1430 for graphics and video data transmission, the display ensemble 1406. In some embodiments of the present invention, the display-driver computer 1428 may be a single computer. In alternative embodiments (not shown), the display-driver computer may comprise a computing system, wherein a plurality of driver computers may be supervised by a coordinating computer to drive all of the color displays. In some of these alternative embodiments, the computing system may comprise one, or more, set-top boxes. In some embodiments of the present invention (shown), the display-driver computer 1428 and the cloud-based display-ensemble service solution 1420 may be distinct computing systems. In these embodiments wherein the display-driver computer 1428 and the cloud-based display-ensemble service solution 1420 are distinct computing systems, the display-driver computer 1428 and the cloud-based display-ensemble service solution 1420 may be linked via a wired, wireless or other communication link 1432. Exemplary communication links include a serial communication link via a serial port, a USB link, an Ethernet link and other wired and wireless communication links In alternative embodiments of the present invention (not shown), one computing system, for example, a cloud-based system, may drive the display ensemble 1406 and also function as the calibration computer. In yet alternative embodiments of the present invention (not shown), a display ensemble may be driven by a cloud service.

A display-ensemble calibration program may reside on a non-transitory computer program product comprising a computer-readable storage medium having instructions stored thereon/in which may be used to program the cloud-based display-ensemble services solution 1420. The display-ensemble calibration program may instruct the cloud-based display-ensemble services solution 1420 to generate and send a command to the digital color camera 1402 effectuating the acquisition, by the digital color camera 1402, of an image of the display ensemble 1406. The display-ensemble calibration program may instruct the cloud-based display-ensemble services solution 1420 to generate and send a command to the colorimeter 1418 effectuating the acquisition of a color measurement on a particular color display 1408, 1410, 1412, 1414. The display-ensemble calibration program may prompt a user to reposition the colorimeter 1418 for subsequent color measurements. The display-ensemble calibration program may instruct the cloud-based display-ensemble services solution 1420 to generate and send a command to command the display-driver computer 1428 to drive the display ensemble 1406 to display one color patch of a plurality of color patches on a particular color display 1408, 1410, 1412, 1414. The display-ensemble calibration program may collect and process image and measurement data to generate camera calibration models for all, or some, of the color displays 1408, 1410, 1412, 1414 in the display ensemble 1406; to collect and process image data from the digital color camera 1402 to generate a Red, a Green or a Blue Gamma 1D look-up table (LUT), collectively referred to as RGB Gamma 1D LUTs, for one, or more, of the color displays 1408, 1410, 1412, 1414 in the display ensemble 1406; and to download the RGB Gamma 1D LUTs associated with a particular color display to the color display 1408, 1410, 1412, 1414 in the display ensemble 1406.

In some embodiments of the present invention wherein a digital color camera may be mounted on a permanent mounting fixture located at a fixed location relative to the display ensemble, whereat the digital color camera may acquire a full view of a display ensemble, camera calibration may be performed less frequently than display calibration due to the fixed camera-display ensemble geometry. In some embodiments of the present invention, a camera-calibration frequency may be based on a known drift rate associated with the camera. In some embodiments of the present invention, a camera-calibration frequency may be based on a known drift rate associated with a display. In some embodiments of the present invention, a display-calibration frequency may be based on a known drift rate associated with the camera. In some embodiments of the present invention, a display-calibration frequency may be based on a known drift rate associated with a display. In some embodiments of the present invention, display calibration may be performed according to a display-calibration schedule. In some of these embodiments, camera recalibration may occur when changes in ambient lighting occur, when changes in object reflections occur or when other changes occur which may impact the camera model. The display calibration schedule may effectuate automatic display-ensemble calibrations during periods when the display ensemble is not otherwise in use. In some embodiments of the present invention, the display calibration schedule may effectuate automatic display-ensemble calibrations according to a fixed-frequency schedule.

Figure 15A:
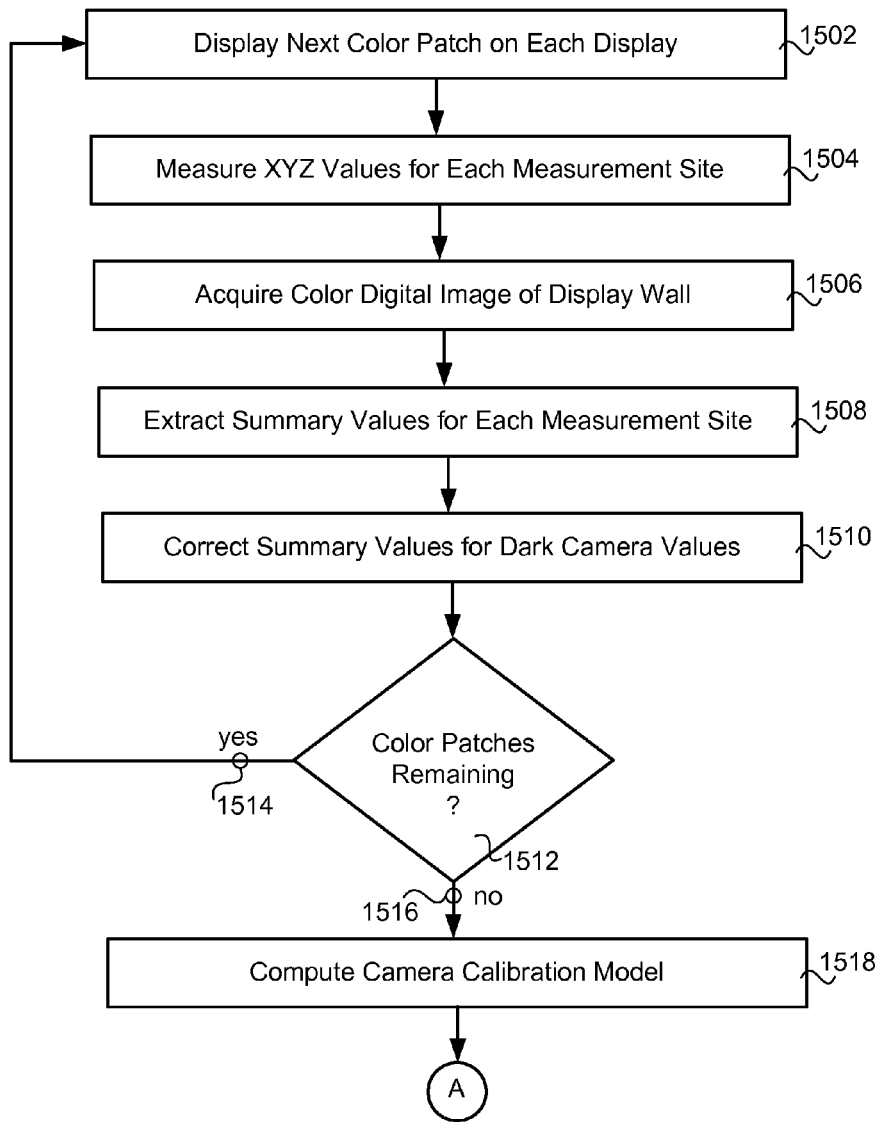
FIG. 15A and FIG. 15B are a chart depicting exemplary embodiments of the present invention, wherein camera calibration and initial display model determination use color-measurement data and color images acquired using a digital color camera.
Figure 15B:
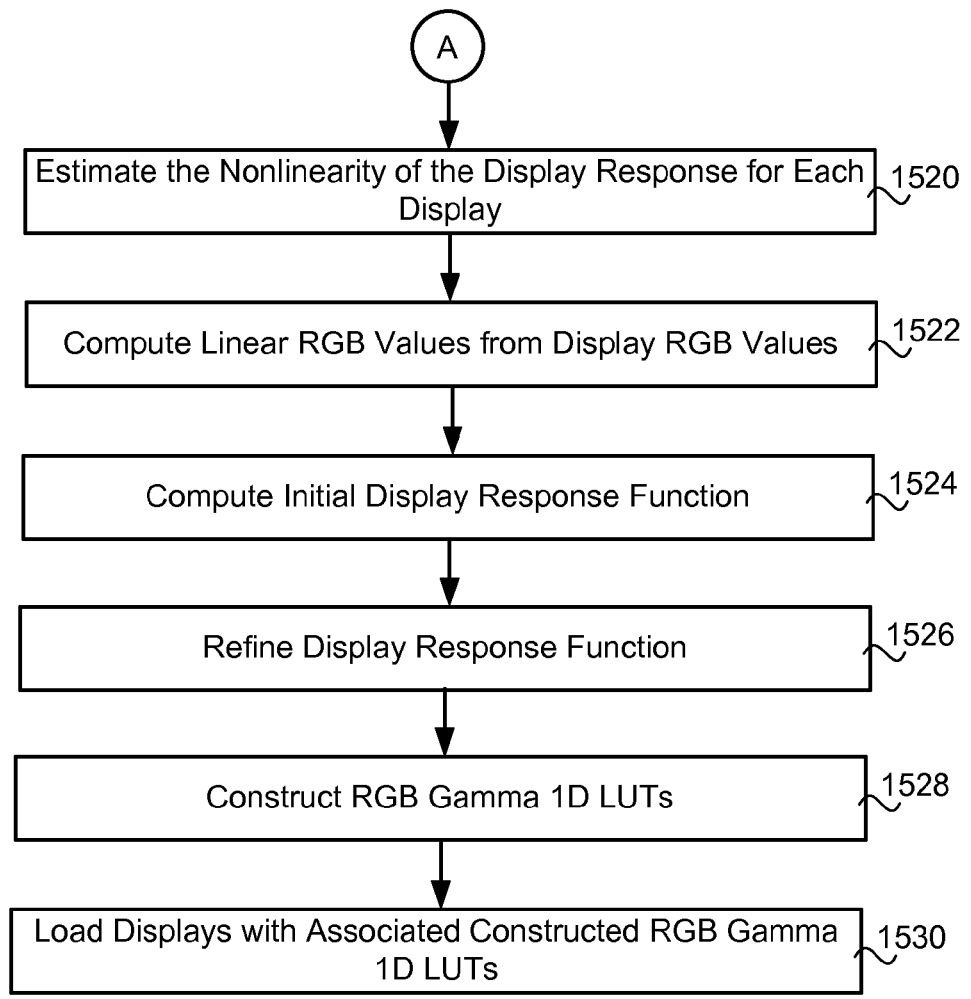

In alternative embodiments of the present invention described in relation to FIG. 15A and FIG. 15B, camera calibration and determination of an initial display response function may use both colorimetric measurements and color images acquired by a digital camera. In some embodiments of the present invention, a next color patch, from a plurality of color patches, may be displayed 1502 on each color display, wherein each color display may be fully warmed up to thermal equilibrium with the environment. In some exemplary embodiments of the present invention, twelve color patches may be displayed, in turn, on each color display in the measurement site associated with the color display. In some exemplary embodiments, of the twelve color patches, nine color patches may correspond to a sampling of the gray line from black to white with R=G=B. In some embodiments of the present invention, the gray-line sampling may be a uniform sampling. In alternative embodiments, the gray-line sampling may be a non-uniform sampling. In these exemplary embodiments, the other three color patches may be the pure red, pure green and pure blue primaries of the display device, at their maximum signal levels.

Measured CIE XYZ, also referred to as XYZ and colorimeter-measured XYZ, values may be obtained from a color-measurement device, for example, a colorimeter, a spectroradiometer or other instrument for measuring display color outputs, appropriately positioned to make a measurement 1504 at each measurement site. The colorimeter-measured XYZ values may be denoted:

$$XYZ_{measured}^{(i,j)},$$

where (i, j) may denote the ith display and the jth color patch, and $XYZ_{measured}^{(i,j)}$ is a three-element vector containing the X, Y and Z values obtained by the color-measurement device.

The three color component values in a three-element color vector, for example, the red component, the green component and the blue component in an RGB vector and the X component, the Y component and the Z component in a CIE XYZ vector, may be collectively referred to as a value, for example, an RGB value and an XYZ value.

A color-patch image may be acquired 1506 of the display ensemble, wherein each color display in the display ensemble is displaying, in the associated measurement site, the color patch. A summary value associated with a measurement region of a color display may be extracted 1508. In an exemplary embodiment of the present invention, an average of the red (R) values, the green (G) values and the blue (B) values of the pixels located within a measurement site may be extracted 1508 from the color-patch image. The summary values may be dark corrected 1510 according to:

$$RGB_{CDC}^{(i,j)}=RGB_{CP}^{(i,j)}-RGB_{CD}^{(i,j)},$$

where each $RGB*^{(i,j)}$ is a three-element vector containing R, G and B values associated with the ith display and the jth color patch, and the identifiers CDC, CP and CD may denote the dark-corrected camera RGB values, the summary camera RGB values and the averaged dark camera RGB values, respectively.

A determination 1512 may be made as to whether or not all of the color patches in the plurality of color patches have been displayed and whether or not the resulting color measurements and acquired color-patch images have been processed. If there are patches remaining to be displayed 1514, then the next color patch may be displayed 1502 on each color display, and the process may continue until there are no color patches remaining 1516.

A camera calibration model may be computed 1518 for each of the color displays within the display ensemble. A camera calibration model, for a particular color display, may convert dark-corrected camera RGB values into camera-model generated XYZ values. A general model form may be:

$$XYZ_C^{(i)}=F_{CM}^{(i)}(RGB_{CDC}^{(i)}),$$

where $RGB_{CDC}^{(i)}$ is a three-element vector containing dark-corrected camera RGB values associated with the ith display, $XYZ_C^{(i)}$ is a three-element vector containing camera-model generated XYZ values associated with the ith display and $F_{CM}^{(i)}$ a generic camera-calibration model function. In some exemplary embodiments, the camera-calibration model function may be a 3×3 matrix, which may be denoted $M_{CM}^{(i)}$ for the ith display. The model form may be written:

$$XYZ_C^{(i)}=M_{CM}^{(i)}RGB_{CDC}^{(i)},$$

and in some exemplary embodiments, the matrix, $M_{CM}^{(i)}$, may be determined according to:

$$M_{CM}^{(i)} = \begin{bmatrix} X_{measured}^{(i,1)} & X_{measured}^{(i,2)} & \cdots & X_{measured}^{(i,N_C)} \\ Y_{measured}^{(i,1)} & Y_{measured}^{(i,2)} & \cdots & Y_{measured}^{(i,N_C)} \\ Z_{measured}^{(i,1)} & Z_{measured}^{(i,2)} & \cdots & Z_{measured}^{(i,N_C)} \end{bmatrix} / \begin{bmatrix} R_{CDC}^{(i,1)} & R_{CDC}^{(i,2)} & \cdots & R_{CDC}^{(i,N_C)} \\ G_{CDC}^{(i,1)} & G_{CDC}^{(i,2)} & \cdots & G_{CDC}^{(i,N_C)} \\ B_{CDC}^{(i,1)} & B_{CDC}^{(i,2)} & \cdots & B_{CDC}^{(i,N_C)} \end{bmatrix},$$

where $N_C$ may denote the number of color patches, $X_{measured}^{(i,j)}$, $Y_{measured}^{(i,j)}$ and $Z_{measured}^{(i,j)}$ may denote the X, Y and Z component values, respectively, of $XYZ_{measured}^{(i,j)}$ for j=1, . . . , $N_C$ and $R_{CDC}^{(i,j)}$, $G_{CDC}^{(i,j)}$ and $B_{CDC}^{(i,j)}$ may denote the R, G and B component values, respectively, of $RGB_{CDC}^{(i,j)}$ for j=1, . . . , $N_C$ and •/• may denote a matrix right division function, for example, such as the one provided by the MATLAB programming language. Alternative regression methods may be used to estimate $M_{CM}^{(i)}$ in alternative embodiments of the present invention. In alternative embodiments, the camera may not be modeled by a linear model, and a generic camera-calibration model function, $F_{CM}^{(i)}$, may be estimated.

After a camera calibration is performed and a camera model is computed for each color display, a display calibration may be performed.

The RGB values of the nine gray patches and the corresponding colorimeter-measured Y values may be used to estimate 1520 the nonlinearity of each display response, thereby generating 1-Dimensional (1-D) display tone response functions, which may be used to compute 1522 linear RGB values from the input display RGB values, with respect to the colorimeter-measured Y values. In the exemplary embodiments of the present invention wherein nine gray patches with R=G=B may be used to estimate the non-linear luminance (Y) response of the display device in response to input gray signals with R=G=B, all three functions, $F_{RL}^{(i)}(\bullet)$, $F_{GL}^{(i)}(\bullet)$, $F_{BL}^{(i)}(\bullet)$, may be the same function. The linear RGB values, therefore, may be determined, from the input display RGB values, which may be denoted $R_P^j$, $G_P^j$ and $B_P^j$ for the jth color patch, according to:

$$R_L^{(i,j)}=F_{RL}^{(i)}(R_P^j),\ G_L^{(i,j)}=F_{GL}^{(i)}(G_P^{(j)})\text{ and}$$
$$B_{LL}^{(i,j)}=F_{BL}^{(i)}(B_P^{(j)}),$$

where $R_L^{(i,j)}$, $G_L^{(i,j)}$ and $B_{LL}^{(i,j)}$ may denote the linear Red, Green and Blue values, respectively, associated with the ith color display and the jth color patch.

In alternative embodiments of the present invention, the nonlinear response of the display device may be estimated with respect to alternative components of the XYZ triad.

In some exemplary embodiments of the present invention, an initial display response function may be computed 1524, using the colorimeter-measured XYZ values and the linear display RGB values, wherein the initial display response function may be modeled as the application of a 3×3 matrix, which may be denoted $M_{DM}^{(i)}$ for the ith color display, to the linear display RGB values. The model form may be written:

$$XYZ_{measured}^{(i)}=M_{DM}^{(i)}RGB_L^{(i)},$$

and in some exemplary embodiments, the matrix, $M_{DM}^{(i)}$, may be determined according to:

$$M_{DM}^{(i)} = \begin{bmatrix} X_{measured}^{(i,1)} & X_{measured}^{(i,2)} & \ldots & X_{measured}^{(i,N_C)} \\ Y_{measured}^{(i,1)} & Y_{measured}^{(i,2)} & \ldots & Y_{measured}^{(i,N_C)} \\ Z_{measured}^{(i,1)} & Z_{measured}^{(i,2)} & \ldots & Z_{measured}^{(i,N_C)} \end{bmatrix} / \begin{bmatrix} R_L^{(i,1)} & R_L^{(i,2)} & \ldots & R_L^{(i,N_C)} \\ G_L^{(i,1)} & G_L^{(i,2)} & \ldots & G_L^{(i,N_C)} \\ B_L^{(i,1)} & B_L^{(i,2)} & \ldots & B_L^{(i,N_C)} \end{bmatrix},$$

where $N_C$ may denote the number of color patches, $X_{measured}^{(i,j)}$, $Y_{measure}^{(i,j)}$ and $Z_{measured}^{(i,j)}$ may denote the X, Y and Z components, respectively, of $XYZ_{measured}^{(i,j)}$ for j=1, ..., $N_C$ and $R_L^{(i,j)}$, $G_L^{(i,j)}$ and $B_L^{(i,j)}$ may denote the R, G and B components, respectively, of $RGB_L^{(i,j)}$ for j=1, ..., $N_C$ and •/• may denote a matrix right division function, for example, such as is provided by the MATLAB programming language. Alternative regression methods may be used to estimate $M_{DM}^{(i)}$ in alternative embodiments of the present invention. In alternative embodiments, a display may not be modeled by a linear model, and a generic display model function, $F_{DM}^{(i)}$, may be estimated.

With a computed initial display response, $M_{DM}^{(i)}$, given a linear RGB value, a display XYZ value may be estimated for the ith color display according to:

$$\begin{bmatrix} X_C^{(i)} \\ Y_C^{(i)} \\ Z_C^{(i)} \end{bmatrix} = M_{DM}^{(i)} \begin{bmatrix} R_L^{(i)} \\ G_L^{(i)} \\ B_L^{(i)} \end{bmatrix}$$

and, given a displayed XYZ value, a linear RGB value may be estimated for the ith color display according to:

$$\begin{bmatrix} R_L^{(i)} \\ G_L^{(i)} \\ B_L^{(i)} \end{bmatrix} = (M_{DM}^{(i)})^{-1} \begin{bmatrix} X_C^{(i)} \\ Y_C^{(i)} \\ Z_C^{(i)} \end{bmatrix}.$$

The initial display response function for each color display may be refined 1526. In some embodiments of the present invention, the refinement of an initial display response for a color display may be as described above in relation to FIG. 10A and FIG. 10B.

Referring again to FIG. 15B, the RGB Gamma 1D LUTs for each color display may be constructed 1528 and loaded 1530 into the respective color display, according to methods previously described herein.

Some embodiments of the present invention may be described in relation to

FIG. 16. In these embodiments, a display-ensemble calibration program may initialize 1602 the RGB Gamma 1D LUTs in each color display to an identity function, wherein the RGB values sent to the display device are equal to the input RGB values received by the color display. In alternative embodiments, the RGB Gamma 1D LUTs in each color display may be initialized 1602 to an alternative function and appropriate compensation may be performed based on the known alternative initialization function. In yet alternative embodiments (not shown), the RGB Gamma 1D LUTs in each color display may not be initialized, but may be known. In these embodiments, an appropriate compensation may be performed based on the known function. In some embodiments of the present invention, when the RGB Gamma 1D LUTs are known, but do not comprise a mapping from the complete domain to the complete range of values, then initialization of the RGB Gamma 1D LUTs may be required. The display-ensemble calibration program may instruct a calibration computer to generate and send a command to a digital color camera effectuating the acquisition 1604, by the digital color camera, of an initial dark-camera image of the display ensemble with all of the color displays in the display ensemble in a powered-down state under a normal lighting condition. In some embodiments of the present invention, the display-ensemble calibration program may provide a prompt to a user, for example, via a graphical user interface (GUI), via a textual user interface, or via another type of user interface, instructing the user to power down the display ensemble color displays and to set the lighting conditions to a normal lighting condition. In alternative embodiments, the display-ensemble calibration program may instruct the calibration computer to generate and send a command to a display-driver computer requesting the display-driver computer to power down the displays of the display ensemble. An initial summary dark-camera Red value, an initial summary dark-camera Green value and an initial summary dark-camera Blue value may be extracted from the acquired initial dark-camera image from a designated measurement site on each color display in the display ensemble. An exemplary summary value may be an average value of all respective values within a designated measurement site. The display-ensemble calibration program may store measurement-site identification information that facilitates the extraction, from the dark-camera image or other image of the display ensemble, of the RGB values of the camera image pixels located within the measurement sites. In an exemplary embodiment of the present invention, the measurement-site identification information may comprise a mask image, wherein measurement-site pixels values are a first fixed value and non-measurement-site pixel values are a second fixed value. In an alternative embodiment, measurement-site identification information may comprise values associated with a parametric description identifying a measurement site, for example the centers and radii of circular sites, describing the measurement-site locations relative to a readily identifiable origin within the image. After the initial dark-camera image is obtained 1604, camera calibration may be performed 1606 using the initial summary dark-camera RGB values.

Updated dark-camera RGB values may be obtained 1608 after camera calibration, and display calibration may be performed 1610.

Some embodiments of the present invention may be described in relation to FIG. 17. In these embodiments, a display-ensemble calibration program may initialize 1702 the RGB Gamma 1D LUTs in each color display to an identity function, wherein the RGB values sent to the display device are equal to the input RGB values received by the color display. In alternative embodiments, the RGB Gamma 1D LUTs in each color display may be initialized 1702 to an alternative function and appropriate compensation may be performed based on the known alternative initialization function. In yet alternative embodiments (not shown), the RGB Gamma 1D LUTs in each color display may not be initialized, but may be known. In these embodiments, an appropriate compensation may be performed based on the known function. In some embodiments of the present invention, when the RGB Gamma 1D LUTs are known, but do not comprise a mapping from the complete domain to the complete range of values, then initialization may be required. The display-ensemble calibration program may instruct a calibration computer to generate and send a command to a digital color camera effectuating the acquisition 1704, by the digital color camera, of an initial dark-camera image of the display ensemble with all of the color displays in the display ensemble in a powered-down state under a normal lighting condition. In some embodiments of the present invention, the display-ensemble calibration program may provide a prompt to a user, for example, via a graphical user interface (GUI), via a textual user interface, or via another type of user interface, instructing the user to power down the display ensemble color displays and to set the lighting conditions to a normal lighting condition. In alternative embodiments, the display-ensemble calibration program may instruct the calibration computer to generate and send a command to a display-driver computer requesting the display-driver computer to power down the display ensemble displays. An initial summary dark-camera Red value, an initial summary dark-camera Green value and an initial summary dark-camera Blue value may be extracted from the acquired initial dark-camera image from a designated measurement site on each color display in the display ensemble. An exemplary summary value may be an average value of all respective values within a designated measurement site. The display-ensemble calibration program may store measurement-site identification information that facilitates the extraction, from the dark-camera image or other image of the display ensemble, of the RGB values of the camera image pixels located within the measurement sites. In an exemplary embodiment of the present invention, the measurement-site identification information may comprise a mask image, wherein measurement-site pixel values are a first fixed value and non-measurement-site pixel values are a second fixed value. In an alternative embodiment, measurement-site identification information may comprise values associated with a parametric description identifying a measurement site, for example the centers and radii of circular sites, describing the measurement-site locations relative to a readily identifiable origin within the image. After the initial dark-camera image is obtained 1704, camera calibration and initial display model estimation may be performed 1706 using the initial summary dark-camera RGB values.

Updated dark-camera RGB values may be obtained 1708 after camera calibration, and the initial display model estimates may be refined 1710.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A system for calibrating a display apparatus in a display ensemble, said system comprising:
    a display ensemble comprising a plurality of display apparatus;
    a calibration computer communicatively coupled to said display ensemble;
    a digital color camera, wherein:
        said digital color camera is positioned at a location whereat said digital color camera is able to acquire a full-view image of said display ensemble; and
        said digital color camera is communicatively coupled to said calibration computer;
    a color-measurement device communicatively coupled to said calibration computer;
    a display-driver computer communicatively coupled to said display ensemble; and
    a non-transitory computer-readable medium encoded with a computer program code for a method for calibrating a first display apparatus, in said plurality of display apparatus, said method comprising:
        determining a first camera model associated with said first display apparatus using said color-measurement device and said digital color camera;
        determining a first display model associated with said first display apparatus using said digital color camera;
        determining a first Gamma one-dimensional look-up table associated with said first display apparatus using said first display model and said first camera model; and
        loading said first Gamma one-dimensional look-up table into said first display apparatus.

2. A system as described in claim 1, wherein said full-view image comprises a single image.

3. A system as described in claim 1, wherein said full-view image comprises multiple images.

4. A system as described in claim 1, wherein said determining a first camera model comprises:
    acquiring, with said digital color camera, a dark-camera image of said display ensemble, wherein each display apparatus, in said plurality of display apparatus, is in a powered-down state under a normal lighting condition during said acquiring said dark-camera image;
    determining, from said dark-camera image, a dark-camera summary RGB value associated with said first display apparatus;
    acquiring, with said digital color camera, a plurality of color-patch images of said display ensemble, wherein each color-patch image is associated with a color in a plurality of camera-calibration colors;

from each color-patch image, determining a color-patch summary RGB value associated with said first display apparatus, thereby determining a plurality of color-patch summary RGB values;

acquiring, with said color-measurement device, a color-measurement value, at said first display apparatus, associated with each color in said plurality of camera-calibration colors, thereby acquiring a plurality of color-measurement values;

correcting each color-patch summary RGB value, in said plurality of color-patch summary RGB values, with said dark-camera summary RGB value associated with said first display apparatus, thereby producing a plurality of corrected, color-patch summary RGB values; and calculating said first camera model for said first display apparatus using said plurality of corrected, color-patch summary RGB values and said plurality of color-measurement values.

5. A system as described in claim 4, wherein said plurality of camera-calibration colors comprises the eight colors associated with the corners of the Red-Green-Blue color cube.

6. A system as described in claim 4, wherein said plurality of camera-calibration colors comprises a second plurality of colors associated with a sampling of the gray line.

7. A system as described in claim 4, wherein said first camera model for said first display apparatus comprises a 3-by-3 matrix.

8. A system as described in claim 7, wherein said 3-by-3 matrix is calculated using a regression method.

9. A system as described in claim 4, wherein said determining, from each color-patch image, a color-patch summary RGB value associated with said first display comprises computing an average of all RGB values, in said color-patch image, within a measurement site associated with said first display apparatus.

10. A system as described in claim 4, wherein said dark-camera summary RGB value is an average of all RGB values, in said dark-camera image, within a measurement site associated with said first display apparatus.

11. A system as described in claim 1, wherein each display in said plurality of display apparatus comprises a measurement site.

12. A system as described in claim 1, wherein said computer program code further comprises:
determining a plurality of camera models, wherein each camera model in said plurality of camera models is associated with a display apparatus in said plurality of display apparatus;
determining a plurality of display models, wherein each display model in said plurality of display models is associated with a display apparatus in said plurality of display apparatus;
determining a plurality of Gamma one-dimensional look-up tables, wherein each Gamma one-dimensional look-up table in said plurality of Gamma one-dimensional look-up tables is associated with a display apparatus in said plurality of display apparatus; and
loading each of said Gamma one-dimensional look-up tables in said plurality of Gamma one-dimensional look-up tables into said associated display apparatus.

13. A system as described in claim 1, wherein said display-driver computer and said calibration computer are the same computing device.

14. A system as described in claim 1, wherein said calibration computer comprises a display-ensemble service solution within a cloud computing environment.

15. A system as described in claim 1, wherein said display-driver computer comprises a display-driver system within a cloud computing environment.

16. A system as described in claim 1, wherein said color-measurement device is a device selected from the group consisting of a colorimeter and a spectroradiometer.

17. A system as described in claim 1, wherein said digital color camera is attached to a permanent structure in a fixed position relative to said display ensemble.

18. A system as described in claim 17, wherein said determining a first display model is scheduled to occur at a first time whereat said display ensemble is not in use.

19. A system as described in claim 17, wherein said determining a first display model is scheduled to occur at a plurality of times whereat said display ensemble is not in use.

20. A system as described in claim 19, wherein said plurality of times occur with a periodic frequency.

21. A system as described in claim 17, wherein said determining a first camera model and said determining a first display model do not occur at substantially the same time.

22. A system as described in claim 1, wherein said method further comprises:
detecting specular highlights; and
compensating for said detected specular highlights.

23. A system as described in claim 1, wherein said first Gamma one-dimensional look-up table is a Gamma one-dimensional look-up table associated with a color component selected from the group consisting of red, green and blue.

24. A system as described in claim 1, wherein said determining a first display model comprises:
determining a first initial model of a display response function associated with said first display apparatus; and
refining said first initial model.

25. A system as described in claim 24, wherein said determining a first initial model comprises using said color-measurement device.

26. A system as described in claim 25, wherein said determining a first initial model comprises:
acquiring, with said color-measurement device, a color-measurement value, at said first display apparatus, associated with each color in a first plurality of display-calibration colors, thereby producing a plurality of color-measurement values;
computing a linear RGB value for each color value in said plurality of display-calibration colors, thereby producing a plurality of linear RGB values; and
calculating said first initial model for said first display apparatus using said plurality of linear RGB values and said plurality of color-measurement values.

27. A system as described in claim 26, wherein said first initial model for said first display apparatus comprises a 3-by-3 matrix.

28. A system as described in claim 27, wherein said 3-by-3 matrix is calculated using a regression method.

29. A system as described in claim 24, wherein said determining a first initial model comprises:
acquiring, with said digital color camera, a dark-camera image of said display ensemble, wherein each display apparatus, in said plurality of display apparatus, is in a powered-down state under a normal lighting condition during said acquiring said dark-camera image;
determining, from said dark-camera image, a dark-camera summary RGB value associated with said first display apparatus;
acquiring, with said digital color camera, a first plurality of color-patch images of said display ensemble, wherein each color-patch image, in said first plurality of color-patch images, is associated with a color in a plurality of display-calibration colors;

from each color-patch image, in said first plurality of color-patch images, determining a color-patch summary RGB value associated with said first display apparatus, thereby producing a plurality of color-patch summary RGB values;

correcting each color-patch summary RGB value, in said plurality of color-patch summary RGB values, with said dark-camera summary RGB value associated with said first display, thereby producing a plurality of dark-corrected, color-patch summary RGB values;

applying said first camera model to each corrected, color-patch summary RGB value in said plurality of corrected, color-patch summary RGB values, thereby producing a plurality of camera-model generated XYZ values;

computing a linear RGB value for each color value in said plurality of display-calibration colors, thereby producing a plurality of linear RGB values; and calculating said first initial model for said first display apparatus using said plurality of linear RGB values and said plurality of camera-model generated XYZ values.

30. A system as described in claim 29, wherein said first initial model for said first display apparatus comprises a 3-by-3 matrix.

31. A system as described in claim 30, wherein said 3-by-3 matrix is calculated using a regression method.

32. A system as described in claim 29, wherein said determining, from each color-patch image, a color-patch summary RGB value associated with said first display apparatus comprises computing an average of all RGB values, in said color-patch image, within a measurement site associated with said first display apparatus.

33. A system as described in claim 29, wherein said dark-camera summary RGB value is an average of all RGB values, in said dark-camera image, within a measurement site associated with said first display apparatus.

34. A system as described in claim 24, wherein said refining said initial model comprises:
acquiring, with said digital color camera, a second plurality of color-patch images of said display ensemble, wherein each color-patch image is associated with a color in a plurality of refinement colors, wherein said refinement colors are around a neutral gray scale.

35. A system as described in claim 24, wherein said refining said first initial model comprises:
constructing, in a first color space, a plurality of refinement colors, wherein said refinement colors surround a desired neutral gray scale;
converting said plurality of refinement colors from said first color space to an XYZ color space;
obtaining a plurality of linear RGB values from said plurality of converted refinement colors using said first initial model associated with said first display apparatus;
performing a clipping operation on said plurality of linear RGB values, thereby producing a plurality of realizable, linear RGB values;
converting said plurality of realizable, linear RGB values to a plurality of display RGB values by applying an inverse display tone response function obtained in said determining a first initial model;
obtaining a plurality of camera-model generated XYZ values using said plurality of display RGB values;
tessellating, in a second color space, a plurality of values associated with said camera-model generated XYZ values into a plurality of tetrahedra associated with said first display apparatus; and
constructing said first Gamma one-dimensional look-up table using said plurality of tetrahedra.

36. A system as described in claim 35, wherein said first color space is an Lab color space and said second color space is a color space selected from the group consisting of an Lab color space and an XYZ color space.

37. A system as described in claim 35, wherein said tessellating comprises applying a Delaunay tessellation algorithm.

38. A system as described in claim 35, wherein said constructing comprises:
determining a maximum display-ensemble luminance value associated with said plurality of display apparatus;
sampling a luminance scale from a zero value to said maximum display-ensemble luminance value, thereby producing a plurality of luminance values;
combining said plurality of luminance values with a desired white point chromaticity;
performing a tetrahedral interpolation using said plurality of tetrahedra associated with said first display, thereby producing a plurality of linear RGB values associated with said plurality of luminance values; and
applying an inverse display tone response function obtained in said determining a first initial model to said plurality of linear RGB values to obtain a plurality of display RGB values; and
forming said first Gamma one-dimensional look-up-table using said plurality of display RGB values.

39. A system for calibrating a display in a display ensemble, said system comprising:
a display ensemble comprising a plurality of display apparatus;
a calibration computer communicatively coupled to said display ensemble;
a digital color camera, wherein:
said digital color camera is positioned at a location whereat said digital color camera is able to acquire a full-view image of said display ensemble; and
said digital color camera is communicatively coupled to said calibration computer;
a color-measurement device communicatively coupled to said calibration computer;
a display-driver computer communicatively coupled to said display ensemble; and
a non-transitory computer-readable medium encoded with a computer program code for a method for calibrating a display apparatus, in said plurality of display apparatus, said method comprising:
determining a camera model associated with said display apparatus using said color-measurement device and said digital color camera;
determining an initial display model associated with said display apparatus using said color-measurement device;
refining said initial display model associated with said display apparatus using said digital color camera, thereby producing a display apparatus model;
determining a Gamma one-dimensional look-up table associated with said display apparatus using said display model and said camera model; and
loading said Gamma one-dimensional look-up table into said display apparatus.

* * * * *